(12) United States Patent
Bassett

(10) Patent No.: US 10,444,774 B2
(45) Date of Patent: Oct. 15, 2019

(54) AGRICULTURAL SYSTEM

(71) Applicant: Dawn Equipment Company, Sycamore, IL (US)

(72) Inventor: Joseph D. Bassett, Sycamore, IL (US)

(73) Assignee: Dawn Equipment Company, Sycamore, IL (US)

( * ) Notice: Subject to any disclaimer, the term of this patent is extended or adjusted under 35 U.S.C. 154(b) by 0 days.

(21) Appl. No.: 15/637,692

(22) Filed: Jun. 29, 2017

(65) Prior Publication Data

US 2017/0300072 A1    Oct. 19, 2017

Related U.S. Application Data

(63) Continuation-in-part of application No. 14/858,089, filed on Sep. 18, 2015, now Pat. No. 9,848,522.
(Continued)

(51) Int. Cl.
*G05D 16/20* (2006.01)
*A01B 63/00* (2006.01)
(Continued)

(52) U.S. Cl.
CPC ....... *G05D 16/2026* (2013.01); *A01B 63/008* (2013.01); *A01B 63/1115* (2013.01);
(Continued)

(58) Field of Classification Search
CPC ........... G05D 16/2026; G05D 16/2013; G05D 16/2006; G05D 16/20; G05D 16/00;
(Continued)

(56) References Cited

U.S. PATENT DOCUMENTS 114,002 A    4/1871   Godfrey
123,966 A    2/1872   Wing
(Continued)

FOREIGN PATENT DOCUMENTS

BE    551372    10/1956
CA    530673    9/1956
(Continued)

OTHER PUBLICATIONS

Case Corporation Brochure, Planters 900 Series Units/Modules Product Information, Aug. 1986 (4 pages).
(Continued)

*Primary Examiner* — Christopher J. Novosad
(74) *Attorney, Agent, or Firm* — Nixon Peabody LLP

(57) ABSTRACT

A control system for controlling the down pressure applied to a soil-engaging component of an agricultural implement includes a down pressure actuator coupled to the soil-engaging component, and an energy storage device and a piston-containing cylinder are coupled to each other by a system containing pressurized fluid. A check valve is coupled between the energy storage device and the down pressure actuator to control the flow of the pressurized fluid from the energy storage device to the cylinder. A controllable relief valve and variable orifice are coupled between the down pressure actuator and the energy storage device to control the flow of the pressurized fluid from the cylinder to the energy storage device. A controller supplies control signals to the relief valve and variable orifice to control the flow of the pressurized fluid from the cylinder to the energy storage device based on the pressure of the pressurized fluid.

17 Claims, 23 Drawing Sheets

Related U.S. Application Data

(60) Provisional application No. 62/085,334, filed on Nov. 28, 2014, provisional application No. 62/076,767, filed on Nov. 7, 2014.

(51) Int. Cl.
*A01B 63/111* (2006.01)
*A01B 63/28* (2006.01)
*A01C 7/20* (2006.01)
*A01C 5/06* (2006.01)
*G01L 5/00* (2006.01)
*F16K 31/12* (2006.01)
*F16K 31/122* (2006.01)

(52) U.S. Cl.
CPC .............. *A01B 63/28* (2013.01); *A01C 7/205* (2013.01); *G01L 5/0061* (2013.01); *A01C 5/064* (2013.01); *F16K 31/122* (2013.01)

(58) Field of Classification Search
CPC ..... A01B 63/008; A01B 63/002; A01B 63/00; A01B 63/1115; A01B 63/111; A01B 63/10; A01B 63/02; A01B 63/28; A01B 63/24; A01B 63/14; A01C 7/205; A01C 7/201; A01C 7/20; A01C 7/00; A01C 5/064; A01C 5/062; A01C 5/06; A01C 5/00; G01L 5/0061; G01L 5/00; F16K 31/122; F16K 31/12; F16K 31/00
See application file for complete search history.

(56) References Cited

U.S. PATENT DOCUMENTS

| | | |
|---|---|---|
| 321,906 A | 7/1885 | McCormick |
| 353,491 A | 2/1886 | Wells |
| 523,508 A | 7/1894 | Bauer |
| 736,369 A | 8/1903 | Dynes |
| 803,088 A | 10/1905 | Barker |
| 1,069,264 A | 8/1913 | Keller |
| 1,134,462 A | 4/1915 | Kendrick |
| 1,158,023 A | 10/1915 | Beaver |
| 1,247,744 A | 11/1917 | Trimble |
| 1,260,752 A | 3/1918 | Casaday |
| 1,321,040 A | 11/1919 | Hoffman |
| 1,391,593 A | 9/1921 | Sweeting |
| 1,398,668 A | 11/1921 | Bordsen |
| 1,481,981 A | 1/1924 | Boye |
| 1,791,462 A | 2/1931 | Bermel |
| 1,844,255 A | 2/1932 | Kaupke |
| 1,901,299 A | 3/1933 | Johnson |
| 1,901,778 A | 3/1933 | Schlag |
| 1,938,132 A | 12/1933 | Broemmelsick |
| 2,014,334 A | 9/1935 | Johnson |
| 2,058,539 A | 10/1936 | Welty |
| 2,249,637 A | 7/1941 | Rietz |
| 2,269,051 A | 1/1942 | Cahoy |
| 2,285,932 A | 6/1942 | Leavitt |
| 2,298,539 A | 10/1942 | Mott |
| 2,341,143 A | 2/1944 | Herr |
| 2,505,276 A | 4/1950 | Boroski |
| 2,561,763 A | 7/1951 | Waters |
| 2,593,176 A | 4/1952 | Patterson |
| 2,596,527 A | 5/1952 | Bushong |
| 2,611,306 A | 9/1952 | Strehlow |
| 2,612,827 A | 10/1952 | Baggette |
| 2,664,040 A | 12/1953 | Beard |
| 2,691,353 A | 10/1954 | Secondo |
| 2,692,544 A | 10/1954 | Jessup |
| 2,715,286 A | 8/1955 | Saveson |
| 2,754,622 A | 7/1956 | Rohnert |
| 2,771,044 A | 11/1956 | Putifer |
| 2,773,343 A | 12/1956 | Oppel |
| 2,777,373 A | 1/1957 | Pursche |
| 2,799,234 A | 7/1957 | Chancey |
| 2,805,574 A | 9/1957 | Jackson, Jr. |
| 2,860,716 A | 11/1958 | Flock |
| 2,925,872 A | 2/1960 | Darnell |
| 2,960,358 A | 11/1960 | Christison |
| 3,010,744 A | 11/1961 | Hollis |
| 3,014,547 A | 12/1961 | Van der Lely |
| 3,038,424 A | 6/1962 | Johnson |
| 3,042,121 A | 7/1962 | Broetzman |
| 3,057,092 A | 10/1962 | Curlett |
| 3,058,243 A | 10/1962 | McGee |
| 3,065,879 A | 11/1962 | Jennings |
| 3,080,004 A | 3/1963 | McNair |
| 3,103,993 A | 9/1963 | Gies |
| 3,110,973 A | 11/1963 | Reynolds |
| 3,122,901 A | 3/1964 | Thompson |
| 3,123,152 A | 3/1964 | Biskis |
| 3,256,942 A | 4/1964 | Van Sickle |
| 3,188,989 A | 6/1965 | Johnston |
| 3,213,514 A | 10/1965 | Evans |
| 3,250,109 A | 5/1966 | Spyridakis |
| 3,314,278 A | 4/1967 | Bergman |
| 3,319,589 A | 5/1967 | Moran |
| 3,351,139 A | 11/1967 | Schmitz |
| 3,355,930 A | 12/1967 | Fedorov |
| 3,368,788 A | 2/1968 | Padula |
| 3,368,789 A | 2/1968 | Martin |
| 3,370,450 A | 2/1968 | Scheucher |
| 3,397,933 A | 8/1968 | Hatcher |
| 3,420,273 A | 1/1969 | Greer |
| 3,433,474 A | 3/1969 | Piret |
| 3,447,495 A | 6/1969 | Miller |
| 3,500,937 A | 3/1970 | Erickson |
| 3,507,233 A | 4/1970 | Greig |
| 3,539,020 A | 11/1970 | Andersson |
| 3,543,603 A | 12/1970 | Gley |
| 3,561,541 A | 2/1971 | Woelfel |
| 3,576,098 A | 4/1971 | Brewer |
| 3,581,685 A | 6/1971 | Taylor |
| 3,593,720 A | 7/1971 | Botterill |
| D221,461 S | 8/1971 | Hagenstad |
| 3,606,745 A | 9/1971 | Girodat |
| 3,635,495 A | 1/1972 | Orendorff |
| 3,650,334 A | 3/1972 | Hagenstad |
| 3,653,446 A | 4/1972 | Kalmon |
| 3,701,327 A | 10/1972 | Krumholz |
| 3,708,019 A | 1/1973 | Ryan |
| 3,711,974 A | 1/1973 | Webb |
| 3,718,191 A | 2/1973 | Williams |
| 3,749,035 A | 7/1973 | Cayton |
| 3,753,341 A | 8/1973 | Berg, Jr. |
| 3,766,988 A | 10/1973 | Whitesides |
| 3,774,446 A | 11/1973 | Diehl |
| 3,795,291 A | 3/1974 | Naito |
| 3,906,814 A | 9/1975 | Magnussen |
| 3,939,846 A | 2/1976 | Drozhzhin |
| 3,945,532 A | 3/1976 | Marks |
| 3,975,890 A | 8/1976 | Rodger |
| 3,986,464 A | 10/1976 | Uppiano |
| 4,009,668 A | 3/1977 | Brass |
| 4,018,101 A | 4/1977 | Mihalic |
| 4,044,697 A | 8/1977 | Swanson |
| 4,055,126 A | 10/1977 | Brown |
| 4,058,171 A | 11/1977 | Van der Lely |
| 4,063,597 A | 12/1977 | Day |
| 4,069,029 A | 1/1978 | Hudson |
| 4,096,730 A | 6/1978 | Martin |
| 4,099,576 A | 7/1978 | Jilani |
| 4,122,715 A | 10/1978 | Yokoyama |
| 4,129,082 A | 12/1978 | Betulius |
| 4,141,200 A | 2/1979 | Johnson |
| 4,141,302 A | 2/1979 | Morrison, Jr. |
| 4,141,676 A | 2/1979 | Jannen |
| 4,142,589 A | 3/1979 | Schlagenhauf |
| 4,147,305 A | 4/1979 | Hunt |
| 4,149,475 A | 4/1979 | Bailey |
| 4,157,661 A | 6/1979 | Schindel |
| 4,161,090 A | 7/1979 | Watts, Jr. |
| 4,173,259 A | 11/1979 | Heckenkamp |

(56) References Cited

U.S. PATENT DOCUMENTS

| | | |
|---|---|---|
| 4,182,099 A | 1/1980 | Davis |
| 4,187,916 A | 2/1980 | Harden |
| 4,191,262 A | 3/1980 | Sylvester |
| 4,194,575 A | 3/1980 | Whalen |
| 4,196,567 A | 4/1980 | Davis |
| 4,196,917 A | 4/1980 | Oakes |
| 4,206,817 A | 6/1980 | Bowerman |
| 4,208,974 A | 6/1980 | Dreyer |
| 4,213,408 A | 7/1980 | West |
| 4,225,191 A | 9/1980 | Knoski |
| 4,233,803 A | 11/1980 | Davis |
| 4,241,674 A | 12/1980 | Mellinger |
| 4,249,613 A | 2/1981 | Scribner |
| 4,280,419 A | 7/1981 | Fischer |
| 4,295,532 A | 10/1981 | Williams |
| 4,301,870 A | 11/1981 | Cane |
| 4,307,674 A | 12/1981 | Jennings |
| 4,311,104 A | 1/1982 | Steilen |
| 4,317,355 A | 3/1982 | Hatsuno |
| 4,359,101 A | 11/1982 | Gagnon |
| 4,375,837 A | 3/1983 | van der Lely |
| 4,377,979 A | 3/1983 | Peterson |
| 4,391,335 A | 7/1983 | Birkenbach |
| 4,398,608 A | 8/1983 | Boetto |
| 4,407,371 A | 10/1983 | Hohl |
| 4,407,660 A | 10/1983 | Nevens |
| 4,413,685 A | 11/1983 | Gremelspacher |
| 4,430,952 A | 2/1984 | Murray |
| 4,433,568 A | 2/1984 | Kondo |
| 4,438,710 A | 3/1984 | Paladino |
| 4,445,445 A | 5/1984 | Sterrett |
| 4,461,355 A | 7/1984 | Peterson |
| 4,481,830 A | 11/1984 | Smith |
| 4,499,775 A | 2/1985 | Lasoen |
| 4,506,610 A | 3/1985 | Neal |
| 4,508,178 A | 4/1985 | Cowell |
| 4,528,920 A | 7/1985 | Neumeyer |
| 4,530,405 A | 7/1985 | White |
| 4,537,262 A | 8/1985 | van der Lely |
| 4,538,688 A | 9/1985 | Szucs |
| 4,550,122 A | 10/1985 | David |
| 4,553,607 A | 11/1985 | Behn |
| 4,580,506 A | 4/1986 | Fleischer |
| 4,596,200 A | 6/1986 | Gafford |
| 4,598,654 A | 7/1986 | Robertson |
| 4,603,746 A | 8/1986 | Swales |
| 4,604,906 A | 8/1986 | Scarpa |
| 4,619,329 A | 10/1986 | Gorbett |
| 4,630,773 A | 12/1986 | Ortlip |
| 4,643,043 A | 2/1987 | Furuta |
| 4,646,620 A | 3/1987 | Buchl |
| 4,646,850 A | 3/1987 | Brown |
| 4,648,466 A | 3/1987 | Baker |
| 4,650,005 A | 3/1987 | Tebben |
| 4,669,550 A | 6/1987 | Sittre |
| 4,671,193 A | 6/1987 | States |
| 4,674,578 A | 6/1987 | Bexten |
| 4,682,550 A | 7/1987 | Joy |
| 4,703,809 A | 11/1987 | Van den Ende |
| 4,726,304 A | 2/1988 | Dreyer |
| RE32,644 E | 4/1988 | Brundage |
| 4,738,461 A | 4/1988 | Stephenson |
| 4,744,316 A | 5/1988 | Lienemann |
| 4,762,075 A | 8/1988 | Halford |
| 4,765,190 A | 8/1988 | Strubbe |
| 4,768,387 A | 9/1988 | Kemp |
| 4,776,404 A | 10/1988 | Rogers |
| 4,779,684 A | 10/1988 | Schultz |
| 4,785,890 A | 11/1988 | Martin |
| 4,819,738 A | 4/1989 | Fountain |
| 4,825,957 A | 5/1989 | White |
| 4,825,959 A | 5/1989 | Wilhelm |
| 4,920,901 A | 5/1990 | Pounds |
| 4,926,767 A | 5/1990 | Thomas |
| 4,930,431 A | 6/1990 | Alexander |
| 4,986,367 A | 1/1991 | Kinzenbaw |
| 4,987,841 A | 1/1991 | Rawson |
| 4,998,488 A | 3/1991 | Hansson |
| 5,015,997 A | 5/1991 | Strubbe |
| 5,022,333 A | 6/1991 | McClure |
| 5,027,525 A | 7/1991 | Haukaas |
| 5,033,397 A | 7/1991 | Colburn, Jr. |
| 5,065,632 A | 11/1991 | Reuter |
| 5,074,227 A | 12/1991 | Schwitters |
| 5,076,180 A | 12/1991 | Schneider |
| 5,092,255 A | 3/1992 | Long |
| 5,113,957 A | 5/1992 | Tamai |
| 5,129,282 A | 7/1992 | Bassett |
| 5,136,934 A | 8/1992 | Darby, Jr. |
| 5,190,112 A | 3/1993 | Johnston |
| 5,224,553 A | 7/1993 | Heintzman |
| 5,234,060 A | 8/1993 | Carter |
| 5,240,080 A | 8/1993 | Bassett |
| 5,255,617 A | 10/1993 | Williams |
| 5,269,237 A | 12/1993 | Baker |
| 5,282,389 A | 2/1994 | Faivre |
| 5,285,854 A | 2/1994 | Thacker |
| 5,333,694 A | 8/1994 | Roggenbuck |
| 5,337,832 A | 8/1994 | Bassett |
| 5,341,754 A | 8/1994 | Winterton |
| 5,346,019 A | 9/1994 | Kinzenbaw |
| 5,346,020 A | 9/1994 | Bassett |
| 5,349,911 A | 9/1994 | Holst |
| 5,351,635 A | 10/1994 | Hulicsko |
| 5,379,847 A | 1/1995 | Snyder |
| 5,394,946 A | 3/1995 | Clifton |
| 5,398,771 A | 3/1995 | Hornung |
| 5,419,402 A | 5/1995 | Heintzman |
| 5,427,192 A | 6/1995 | Stephenson |
| 5,443,023 A | 8/1995 | Carroll |
| 5,443,125 A | 8/1995 | Clark |
| 5,461,995 A | 10/1995 | Winterton |
| 5,462,124 A | 10/1995 | Rawson |
| 5,473,999 A | 12/1995 | Rawson |
| 5,474,135 A | 12/1995 | Schlagel |
| 5,477,682 A | 12/1995 | Tobiasz |
| 5,477,792 A | 12/1995 | Bassett |
| 5,479,868 A | 1/1996 | Bassett |
| 5,479,992 A | 1/1996 | Bassett |
| 5,485,796 A | 1/1996 | Bassett |
| 5,485,886 A | 1/1996 | Bassett |
| 5,497,717 A | 3/1996 | Martin |
| 5,497,837 A | 3/1996 | Kehrney |
| 5,499,042 A | 3/1996 | Yanagawa |
| 5,499,683 A | 3/1996 | Bassett |
| 5,499,685 A | 3/1996 | Downing, Jr. |
| 5,517,932 A | 5/1996 | Ott |
| 5,524,525 A | 6/1996 | Nikkel |
| 5,531,171 A | 7/1996 | Whitesel |
| 5,542,362 A | 8/1996 | Bassett |
| 5,544,709 A | 8/1996 | Lowe |
| 5,562,165 A | 10/1996 | Janelle |
| 5,590,611 A | 1/1997 | Smith |
| 5,603,269 A | 2/1997 | Bassett |
| 5,623,997 A | 4/1997 | Rawson |
| 5,640,914 A | 6/1997 | Rawson |
| 5,657,707 A | 8/1997 | Dresher |
| 5,660,126 A | 8/1997 | Freed |
| 5,685,245 A | 11/1997 | Bassett |
| 5,704,430 A | 1/1998 | Smith |
| 5,709,271 A | 1/1998 | Bassett |
| 5,725,057 A | 3/1998 | Taylor |
| 5,727,638 A | 3/1998 | Wodrich |
| 5,730,074 A | 3/1998 | Peter |
| 5,809,757 A | 9/1998 | McLean |
| 5,852,982 A | 12/1998 | Peter |
| 5,868,207 A | 2/1999 | Langbakk |
| 5,878,678 A | 3/1999 | Stephens |
| RE36,243 E | 7/1999 | Rawson |
| 5,953,895 A | 9/1999 | Hobbs |
| 5,970,891 A | 10/1999 | Schlagel |
| 5,970,892 A | 10/1999 | Wendling |
| 5,988,293 A | 11/1999 | Brueggen |
| 6,067,918 A | 5/2000 | Kirby |

(56) References Cited

U.S. PATENT DOCUMENTS

| | | |
|---|---|---|
| 6,068,061 A | 5/2000 | Smith |
| 6,079,340 A | 6/2000 | Flamme |
| 6,082,274 A | 7/2000 | Peter |
| 6,085,501 A | 7/2000 | Walch |
| 6,091,997 A | 7/2000 | Flamme |
| 6,164,385 A | 12/2000 | Buchl |
| 6,176,334 B1 | 1/2001 | Lorenzen |
| 6,223,663 B1 | 5/2001 | Wendling |
| 6,223,828 B1 | 5/2001 | Paulson |
| 6,237,696 B1 | 5/2001 | Mayerle |
| 6,253,692 B1 | 7/2001 | Wendling |
| 6,289,829 B1 | 9/2001 | Fish |
| 6,295,939 B1 | 10/2001 | Emms |
| 6,314,897 B1 | 11/2001 | Hagny |
| 6,325,156 B1 | 12/2001 | Barry |
| 6,330,922 B1 | 12/2001 | King |
| 6,331,142 B1 | 12/2001 | Bischoff |
| 6,343,661 B1 | 2/2002 | Thomspon |
| 6,347,594 B1 | 2/2002 | Wendling |
| 6,382,326 B1 | 5/2002 | Goins |
| 6,389,999 B1 | 5/2002 | Duello |
| 6,453,832 B1 | 9/2002 | Schaffert |
| 6,454,019 B1 | 9/2002 | Prairie |
| 6,460,623 B1 | 10/2002 | Knussman |
| 6,516,595 B2 | 2/2003 | Rhody |
| 6,530,334 B2 | 3/2003 | Hagny |
| 6,575,104 B2 | 6/2003 | Brummelhuis |
| 6,622,468 B2 | 9/2003 | Lucand |
| 6,644,224 B1 | 11/2003 | Bassett |
| 6,681,868 B2 | 1/2004 | Kovach |
| 6,701,856 B1 | 3/2004 | Zoke |
| 6,701,857 B1 | 3/2004 | Jensen |
| 6,715,433 B1 | 4/2004 | Friestad |
| 6,763,773 B2 | 7/2004 | Schaffert |
| 6,786,130 B2 | 9/2004 | Steinlage |
| 6,827,029 B1 | 12/2004 | Wendte |
| 6,834,598 B2 | 12/2004 | Jüptner |
| 6,840,853 B2 | 1/2005 | Foth |
| 6,886,650 B2 | 5/2005 | Bremmer |
| 6,889,943 B2 | 5/2005 | Dinh |
| 6,892,656 B2 | 5/2005 | Schneider |
| 6,907,833 B2 | 6/2005 | Thompson |
| 6,912,963 B2 | 7/2005 | Bassett |
| 6,923,390 B1 | 8/2005 | Barker |
| 6,968,907 B1 | 11/2005 | Raper |
| 6,986,313 B2 | 1/2006 | Halford |
| 6,997,400 B1 | 2/2006 | Hanna |
| 7,004,090 B2 | 2/2006 | Swanson |
| 7,044,070 B2 | 5/2006 | Kaster |
| 7,063,167 B1 | 6/2006 | Staszak |
| 7,159,523 B2 | 1/2007 | Bourgault |
| 7,163,227 B1 | 1/2007 | Burns |
| 7,222,575 B2 | 5/2007 | Bassett |
| 7,290,491 B2 | 11/2007 | Summach |
| 7,325,756 B1 | 2/2008 | Giorgis |
| 7,360,494 B2 | 4/2008 | Martin |
| 7,360,495 B1 | 4/2008 | Martin |
| 7,438,006 B2 | 10/2008 | Mariman |
| 7,451,712 B2 | 11/2008 | Bassett |
| 7,497,174 B2 | 3/2009 | Sauder |
| 7,523,709 B1 | 4/2009 | Kiest |
| 7,540,333 B2 | 6/2009 | Bettin |
| 7,575,066 B2 | 8/2009 | Bauer |
| 7,584,707 B2 | 9/2009 | Sauder |
| 7,665,539 B2 | 2/2010 | Bassett |
| 7,673,570 B1 | 3/2010 | Bassett |
| 7,743,718 B2 | 6/2010 | Bassett |
| 7,870,827 B2 | 1/2011 | Bassett |
| 7,918,285 B1 | 4/2011 | Graham |
| 7,938,074 B2 | 5/2011 | Liu |
| 7,944,210 B2 | 5/2011 | Fischer |
| 7,946,231 B2 | 5/2011 | Martin |
| 7,975,629 B1 | 7/2011 | Martin |
| 8,146,519 B2 | 4/2012 | Bassett |
| 8,151,717 B2 | 4/2012 | Bassett |
| 8,171,707 B2 | 5/2012 | Kitchel |
| D663,326 S | 7/2012 | Allensworth |
| 8,327,780 B2 | 12/2012 | Bassett |
| 8,359,988 B2 | 1/2013 | Bassett |
| 8,380,356 B1 | 2/2013 | Zielke |
| 8,386,137 B2 | 2/2013 | Sauder |
| 8,393,407 B2 | 3/2013 | Freed |
| 8,408,149 B2 | 4/2013 | Rylander |
| 6,644,224 C1 | 6/2013 | Bassett |
| 6,912,963 C1 | 6/2013 | Bassett |
| 7,222,575 C1 | 6/2013 | Bassett |
| 8,544,397 B2 | 10/2013 | Bassett |
| 8,544,398 B2 | 10/2013 | Bassett |
| 8,550,020 B2 | 10/2013 | Sauder |
| 8,573,319 B1 | 11/2013 | Casper |
| 8,634,992 B2 | 1/2014 | Sauder |
| 8,636,077 B2 | 1/2014 | Bassett |
| 8,649,930 B2 | 2/2014 | Reeve |
| 8,746,661 B2 | 6/2014 | Runkel |
| 8,763,713 B2 | 7/2014 | Bassett |
| 8,770,308 B2 | 7/2014 | Bassett |
| 8,776,702 B2 | 7/2014 | Bassett |
| RE45,091 E | 8/2014 | Bassett |
| 8,863,857 B2 | 10/2014 | Bassett |
| 8,910,581 B2 | 12/2014 | Bassett |
| 8,939,095 B2 | 1/2015 | Freed |
| 8,985,232 B2 | 3/2015 | Bassett |
| 9,003,982 B1 | 4/2015 | Elizalde |
| 9,003,983 B2 | 4/2015 | Roth |
| 9,055,712 B2 | 6/2015 | Bassett |
| 9,107,337 B2 | 8/2015 | Bassett |
| 9,107,338 B2 | 8/2015 | Bassett |
| 9,113,589 B2 | 8/2015 | Bassett |
| 9,144,187 B2 | 9/2015 | Bassett |
| 9,148,989 B2 | 10/2015 | Van Buskirk |
| 9,167,740 B2 | 10/2015 | Bassett |
| 9,192,088 B2 | 11/2015 | Bruce |
| 9,192,089 B2 | 11/2015 | Bassett |
| 9,192,091 B2 | 11/2015 | Bassett |
| 9,215,838 B2 | 12/2015 | Bassett |
| 9,215,839 B2 | 12/2015 | Bassett |
| 9,226,440 B2 | 1/2016 | Bassett |
| 9,232,687 B2 | 1/2016 | Bassett |
| 9,241,438 B2 | 1/2016 | Bassett |
| 9,271,437 B2 | 3/2016 | Martin |
| 9,307,690 B2 | 4/2016 | Bassett |
| 9,504,195 B2 | 11/2016 | Bassett |
| 9,615,497 B2 | 4/2017 | Bassett |
| 9,668,398 B2 | 6/2017 | Bassett |
| 9,681,601 B2 | 6/2017 | Bassett |
| 9,723,778 B2 | 8/2017 | Bassett |
| 9,788,472 B2 | 10/2017 | Bassett |
| 9,848,522 B2 * | 12/2017 | Bassett ............... A01B 63/008 |
| 9,861,022 B2 | 1/2018 | Bassett |
| 2002/0162492 A1 | 11/2002 | Juptner |
| 2003/0141086 A1 | 7/2003 | Kovach |
| 2004/0005929 A1 | 1/2004 | Piasecki |
| 2005/0045080 A1 | 3/2005 | Halford |
| 2005/0199842 A1 | 9/2005 | Parsons |
| 2006/0102058 A1 | 5/2006 | Swanson |
| 2006/0118662 A1 | 6/2006 | Korus |
| 2006/0191695 A1 | 8/2006 | Walker et al. |
| 2006/0213566 A1 | 9/2006 | Johnson |
| 2006/0237203 A1 | 10/2006 | Miskin |
| 2007/0044694 A1 | 3/2007 | Martin |
| 2007/0272134 A1 | 11/2007 | Baker |
| 2008/0093093 A1 | 4/2008 | Sheppard |
| 2008/0173220 A1 | 7/2008 | Wuertz |
| 2008/0236461 A1 | 10/2008 | Sauder |
| 2008/0256916 A1 | 10/2008 | Vaske |
| 2009/0260902 A1 | 10/2009 | Holman |
| 2010/0019471 A1 | 1/2010 | Ruckle |
| 2010/0108336 A1 | 5/2010 | Thomson |
| 2010/0180695 A1 | 7/2010 | Sauder |
| 2010/0198529 A1 | 8/2010 | Sauder |
| 2010/0282480 A1 | 11/2010 | Breker |
| 2011/0101135 A1 | 5/2011 | Korus |
| 2011/0147148 A1 | 6/2011 | Ripa |
| 2011/0247537 A1 | 10/2011 | Freed |

(56) References Cited

U.S. PATENT DOCUMENTS

| | | |
|---|---|---|
| 2011/0313575 A1 | 12/2011 | Kowalchuk |
| 2012/0010782 A1 | 1/2012 | Grabow |
| 2012/0167809 A1 | 7/2012 | Bassett |
| 2012/0186216 A1 | 7/2012 | Vaske |
| 2012/0186503 A1 | 7/2012 | Sauder |
| 2012/0216731 A1 | 8/2012 | Schilling |
| 2012/0232691 A1 | 9/2012 | Green |
| 2012/0255475 A1 | 10/2012 | Mariman |
| 2013/0032363 A1 | 2/2013 | Curry |
| 2013/0112121 A1 | 5/2013 | Achen |
| 2013/0112124 A1 | 5/2013 | Bergen |
| 2013/0213676 A1 | 8/2013 | Bassett |
| 2013/0325267 A1 | 12/2013 | Adams |
| 2013/0333599 A1 | 12/2013 | Bassett |
| 2014/0000448 A1 | 1/2014 | Franklin, III |
| 2014/0026748 A1 | 1/2014 | Stoller |
| 2014/0034339 A1 | 2/2014 | Sauder |
| 2014/0034343 A1 | 2/2014 | Sauder |
| 2014/0034344 A1 | 2/2014 | Bassett |
| 2014/0116735 A1 | 5/2014 | Bassett |
| 2014/0165527 A1 | 6/2014 | Oehler |
| 2014/0190712 A1 | 7/2014 | Bassett |
| 2014/0197249 A1 | 7/2014 | Roth |
| 2014/0224513 A1 | 8/2014 | Van Buskirk |
| 2014/0224843 A1 | 8/2014 | Rollenhagen |
| 2014/0278696 A1 | 9/2014 | Anderson |
| 2015/0216108 A1 | 8/2015 | Roth |
| 2016/0100517 A1 | 4/2016 | Bassett |
| 2016/0128263 A1 | 5/2016 | Bassett |
| 2016/0128265 A1 | 5/2016 | Bassett |
| 2016/0270285 A1 | 9/2016 | Hennes |
| 2016/0309641 A1 | 10/2016 | Taunton |
| 2017/0034985 A1 | 2/2017 | Martin |
| 2017/0164548 A1 | 6/2017 | Bassett |
| 2017/0181373 A1 | 6/2017 | Bassett |
| 2017/0231145 A1 | 8/2017 | Bassett |
| 2017/0318741 A1 | 11/2017 | Bassett |
| 2017/0359940 A1 | 12/2017 | Bassett |
| 2018/0000001 A1 | 1/2018 | Bassett |
| 2018/0000002 A1 | 1/2018 | Bassett |

FOREIGN PATENT DOCUMENTS

| | | |
|---|---|---|
| DE | 335464 | 9/1921 |
| DE | 1108971 | 6/1961 |
| DE | 24 02 411 | 7/1975 |
| EP | 2 196 337 B1 | 6/2010 |
| EP | 2 497 348 A1 | 9/2012 |
| GB | 1 574 412 | 9/1980 |
| GB | 2 056 238 A | 10/1982 |
| GB | 2 160 401 A | 12/1985 |
| JP | 54-57726 | 5/1979 |
| SU | 392897 | 8/1973 |
| SU | 436778 | 7/1974 |
| SU | 611201 | 6/1978 |
| SU | 625648 | 9/1978 |
| SU | 1410884 A1 | 7/1988 |
| SU | 1466674 | 3/1989 |
| WO | WO 2001/023241 A2 | 4/2001 |
| WO | WO 2009/145381 A1 | 12/2009 |
| WO | WO 2011/161140 A1 | 12/2011 |
| WO | WO 2012/149367 A1 | 1/2012 |
| WO | WO 2012/149415 A1 | 1/2012 |
| WO | WO 2012/167244 A1 | 12/2012 |
| WO | WO 2013/025898 A1 | 2/2013 |
| WO | WO 2016/073966 A1 | 5/2016 |

OTHER PUBLICATIONS

Buffalo Farm Equipment All Flex Cultivator Operator Manual, Apr. 1990 (7 pages).
Shivvers, Moisture Trac 3000 Brochure, Aug. 21, 1990 (5 pages).
The New Farm, "*New Efficiencies in Nitrogen Application*," Feb. 1991, p. 6 (1 page).
Hiniker Company, Flow & Acreage Continuous Tracking System Monitor Demonstration Manuel, date estimated as early as Feb. 1991 (7 pages).
Russnogle, John, "*Sky Spy: Gulf War Technology Pinpoints Field and Yields*," Top Producer, A Farm Journal Publication, Nov. 1991, pp. 12-14 (4 pages).
Borgelt, Steven C., "*Sensor Technologies and Control Strategies for Managing Variability*," University of Missouri, Apr. 14-16, 1992 (15 pages).
Buffalo Farm Equipment Catalog on Models 4600, 4630, 4640, and 4620, date estimated as early as Feb. 1992 (4 pages).
Hiniker 5000 Cultivator Brochure, date estimated as early as Feb. 1992 (4 pages).
Hiniker Series 5000 Row Cultivator Rigid and Folding Toolbar Operator's Manual, date estimated as early as Feb. 1992 (5 pages).
Orthman Manufacturing, Inc., Rowcrop Cultivator Booklet, date estimated as early as Feb. 1992 (4 pages).
Yetter Catalog, date estimated as early as Feb. 1992 (4 pages).
Exner, Rick, "*Sustainable Agriculture: Practical Farmers of Iowa Reducing Weed Pressure in Ridge-Till*," Iowa State University University Extension, http://www.extension.iastate.edu/Publications/SA2.pdf, Jul. 1992, Reviewed Jul. 2009, retrieved Nov. 2, 2012 (4 pages).
Finck, Charlene, "*Listen to Your Soil*," Farm Journal Article, Jan. 1993, pp. 14-15 (2 pages).
Acu-Grain, "*Combine Yield Monitor 99% Accurate? 'You Bet Your Bushels!!'*" date estimated as early as Feb. 1993 (2 pages).
John Deere, New 4435 Hydro Row-Crop and Small-Grain Combine, date estimated as early as Feb. 1993 (8 pages).
Vansichen, R. et al., "*Continuous Wheat Yield Measurement on a Combine*," date estimated as early as Feb. 1993 (5 pages).
Yetter 2010 Product Catalog, date estimated as early as Jan. 2010 (2 pages).
Yetter Cut and Move Manual, Sep. 2010 (28 pages).
Yetter Screw Adjust Residue Manager Operator's Manual, labeled "2565-729_REV_D" and dated Sep. 2010 on p. 36, retrieved Mar. 10, 2014 from the internet, available online Jul. 13, 2011, at http://web.archive.org/web/20110713162510/http://www.yetterco.com/help/manuals/Screw_Adjust_Residue_ Manager2.pdf.
John Deere, Seat Catalog, date estimated as early Sep. 2011 (19 pages).
Martin Industries, LLC Paired 13" Spading Closing Wheels Brochure, date estimated as early as Jun. 6, 2012, pp. 18-25 (8 pages).
Vogt, Willie, "*Revisiting Robotics*," http://m.farmindustrynews.com/farm-equipment/revisiting-robotics, Dec. 19, 2013 (3 pages).
John Deere, New Semi-Active Sea Suspension, http://www.deere.com/en_US/parts/agparts/semiactiveseat.html, date estimated as early as Jan. 2014, retrieved Feb. 6, 2014 (2 pages).
Extended European Search Report in Application No. EP 18 18 0980, dated Nov. 15, 2018 (18 pages).
Extended European Search Report in Application No. EP 15 85 6490, dated Aug. 6, 2018 (14 pages).
International Search Report in International Application No. PCT/US15/59631, dated Mar. 3, 2016 (4 pages).
Written Opinion of International Searching Authority for International Application No. PCT/US15/59631, dated Mar. 3, 2016 (6 pages).

\* cited by examiner

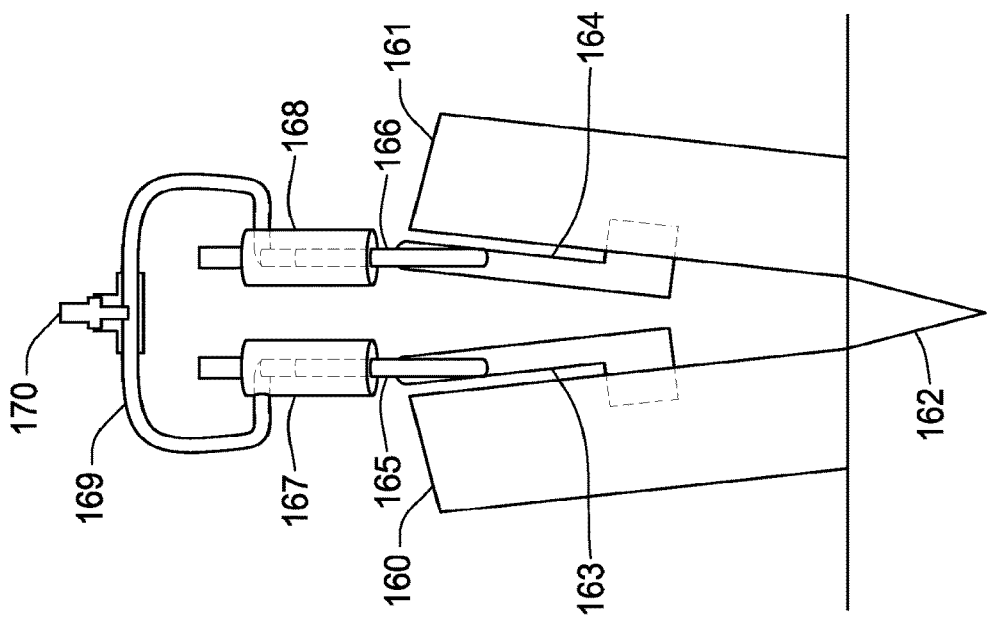
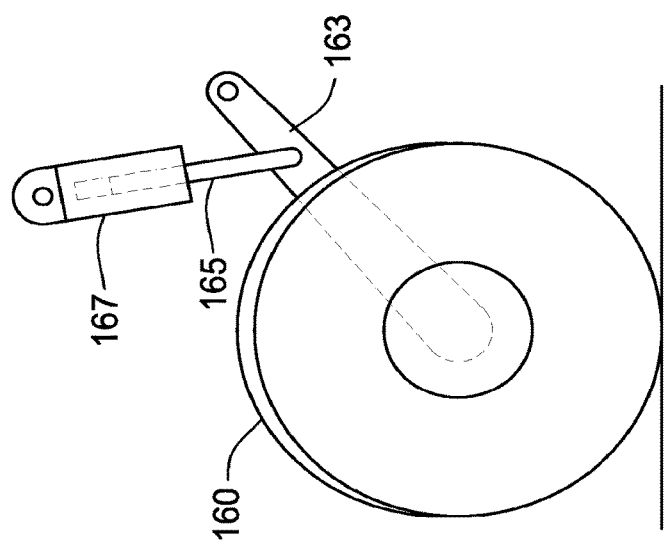
FIG. 18B
FIG. 18A

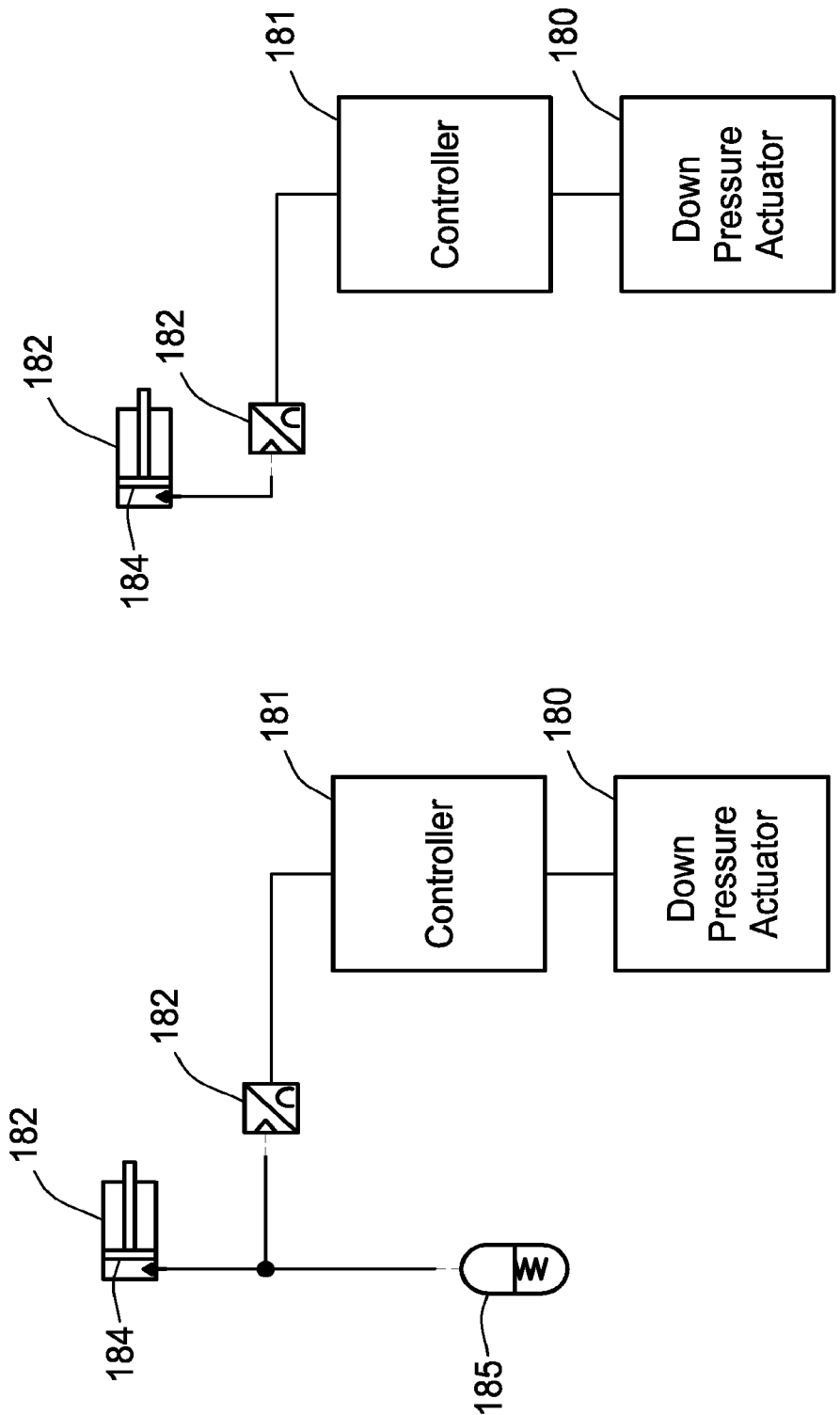

AGRICULTURAL SYSTEM

CROSS-REFERENCE TO RELATED APPLICATIONS

This application claims priority to U.S. application Ser. No. 14/858,089, filed Sep. 18, 2015, U.S. Provisional Application No. 62/085,334, filed Nov. 28, 2014, and U.S. Provisional Application No. 62/076,767, filed Nov. 7, 2014, each of which is hereby incorporated by reference herein in its entirety.

FIELD OF THE INVENTION

This invention relates generally to agricultural planters and, more particularly, to gauge wheel load sensors and down pressure control systems for agricultural planters.

BRIEF SUMMARY

In accordance with one embodiment, a control system for controlling the down pressure applied to a soil-engaging component of an agricultural implement includes a source of pressurized fluid, a down pressure actuator coupled to the soil-engaging component and to the source of pressurized fluid, an energy storage device and a piston-containing cylinder coupled to each other by a system containing pressurized fluid, a check valve coupled between the energy storage device and the down pressure actuator to control the flow of the pressurized fluid from the energy storage device to the cylinder, a controllable relief valve and a controllable variable orifice coupled between the down pressure actuator and the energy storage device to control the flow of the pressurized fluid from the cylinder to the energy storage device, a pressure sensor coupled to the pressurized fluid and producing an output signal corresponding to the pressure of the pressurized fluid, and a controller coupled to the pressure sensor to receive the output signal and configured to supply control signals to the controllable relief valve and the controllable variable orifice to control the flow of the pressurized fluid from the cylinder to the energy storage device based on the pressure of the pressurized fluid. The energy storage device is preferably an accumulator.

In one implementation, the controller supplies a control signal to the relief valve to open the relief valve in response to a predetermined change in the pressure of the pressurized fluid and also supplies a control signal to the variable orifice to control the size of the orifice when the relief valve is open, to control the rate of flow of pressurized fluid from the energy storage device to the cylinder.

BRIEF DESCRIPTION OF THE DRAWINGS

FIG. 18A is a side elevation of a modified sensing system for detecting the pressure exerted on a pair of gauge wheels.

FIG. 18B is an end elevation of the system shown in FIG. 18A.

FIG. 21 is a schematic diagram of a second modified hydraulic and electrical control system for controlling a down pressure actuator.

FIG. 22 is a schematic diagram of a third modified hydraulic and electrical control system for controlling a down pressure actuator.

DETAILED DESCRIPTION

An agricultural planter typically includes a number of individual row units, each of which includes its own row cleaner device, row opener device and row closing device. The down pressure is typically controlled separately for each row unit or each of several groups of row units, and is preferably controlled separately for one or more of the individual devices in each row unit, as described in more detail in pending U.S. application Ser. No. 14/146,822 filed Jan. 3, 2014, which is incorporated by reference herein in its entirety.

Figure 1:
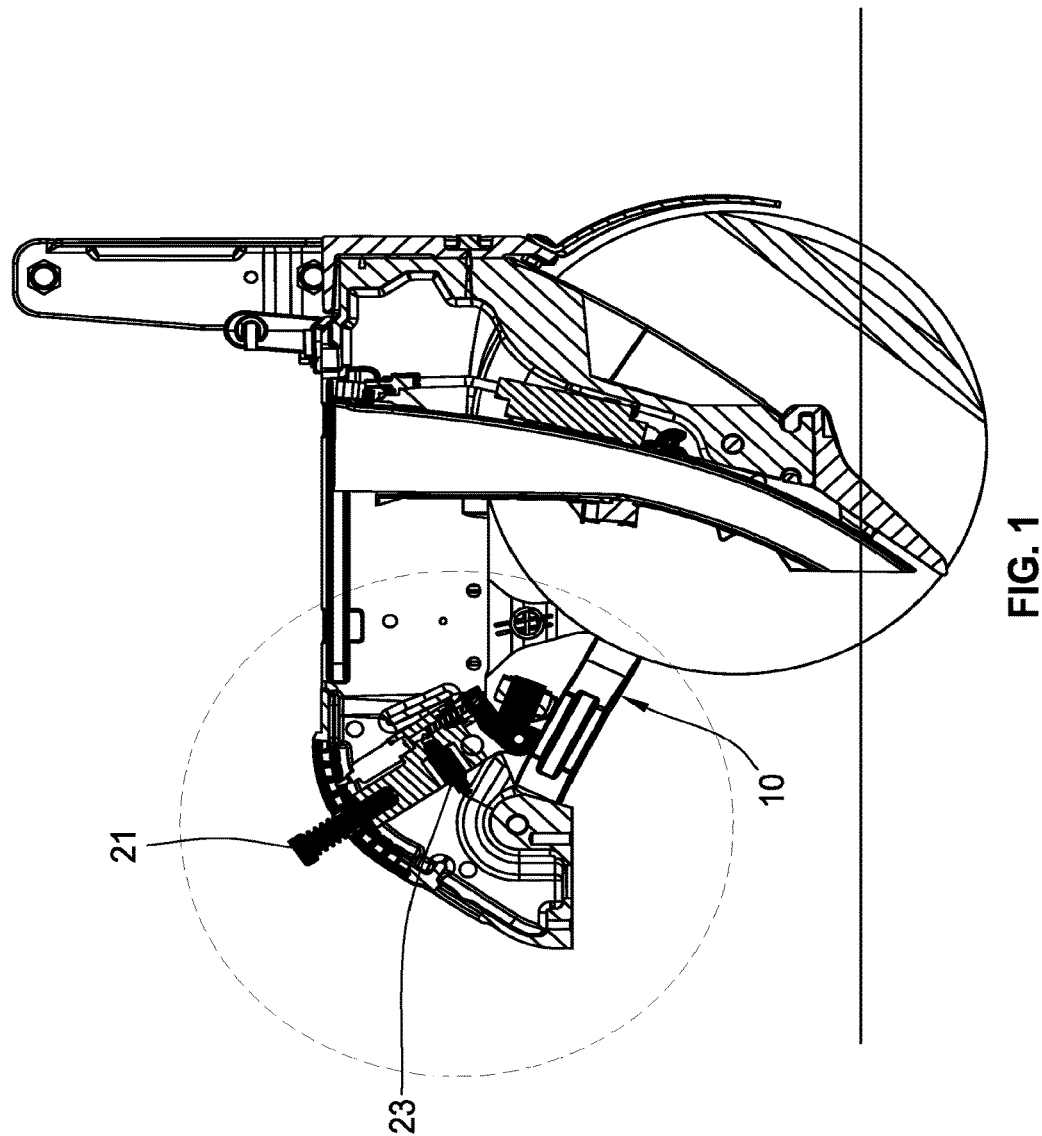
FIG. 1 is a vertical longitudinal section through a portion of an agricultural planter that includes a gauge wheel and an opener device.
Figure 2:
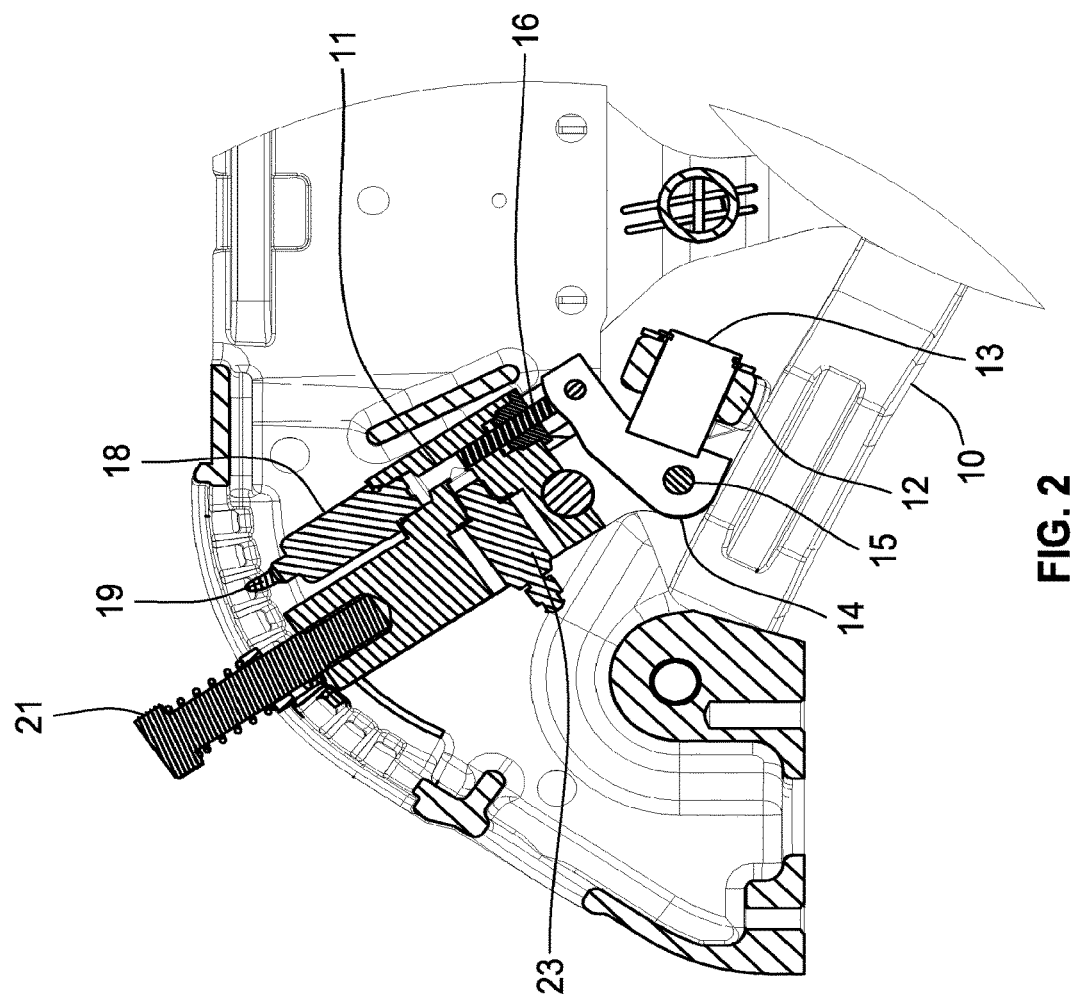
FIG. 2 is an enlargement of the left side of FIG. 1.
Figure 3:
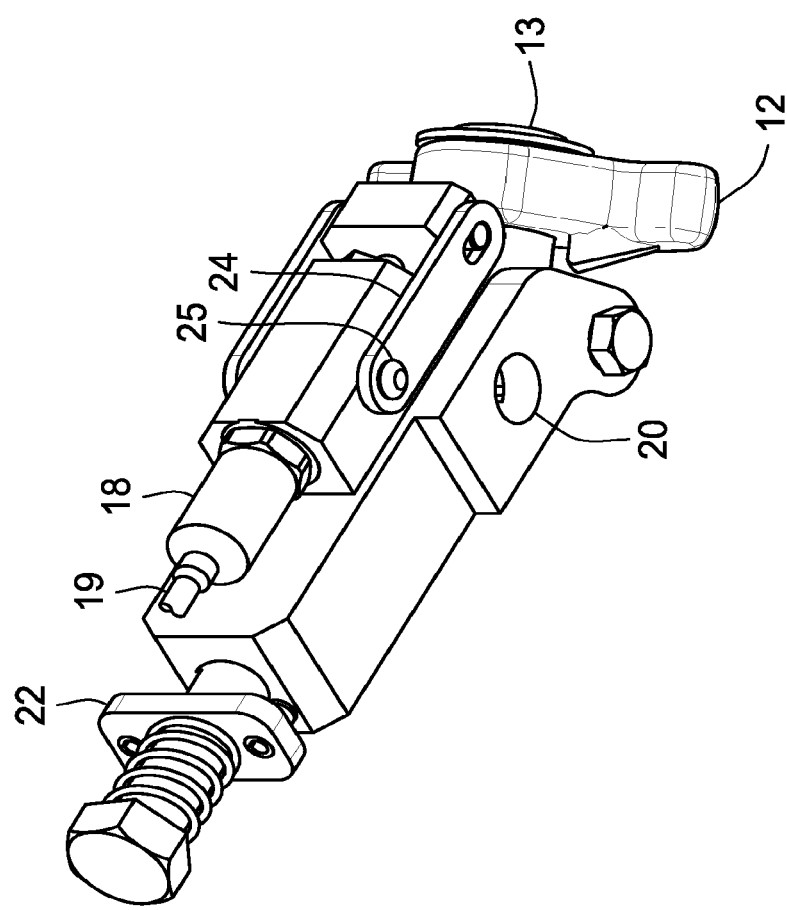
FIG. 3 is a bottom perspective of the control portion of the equipment shown in FIG. 1.
Figure 4:
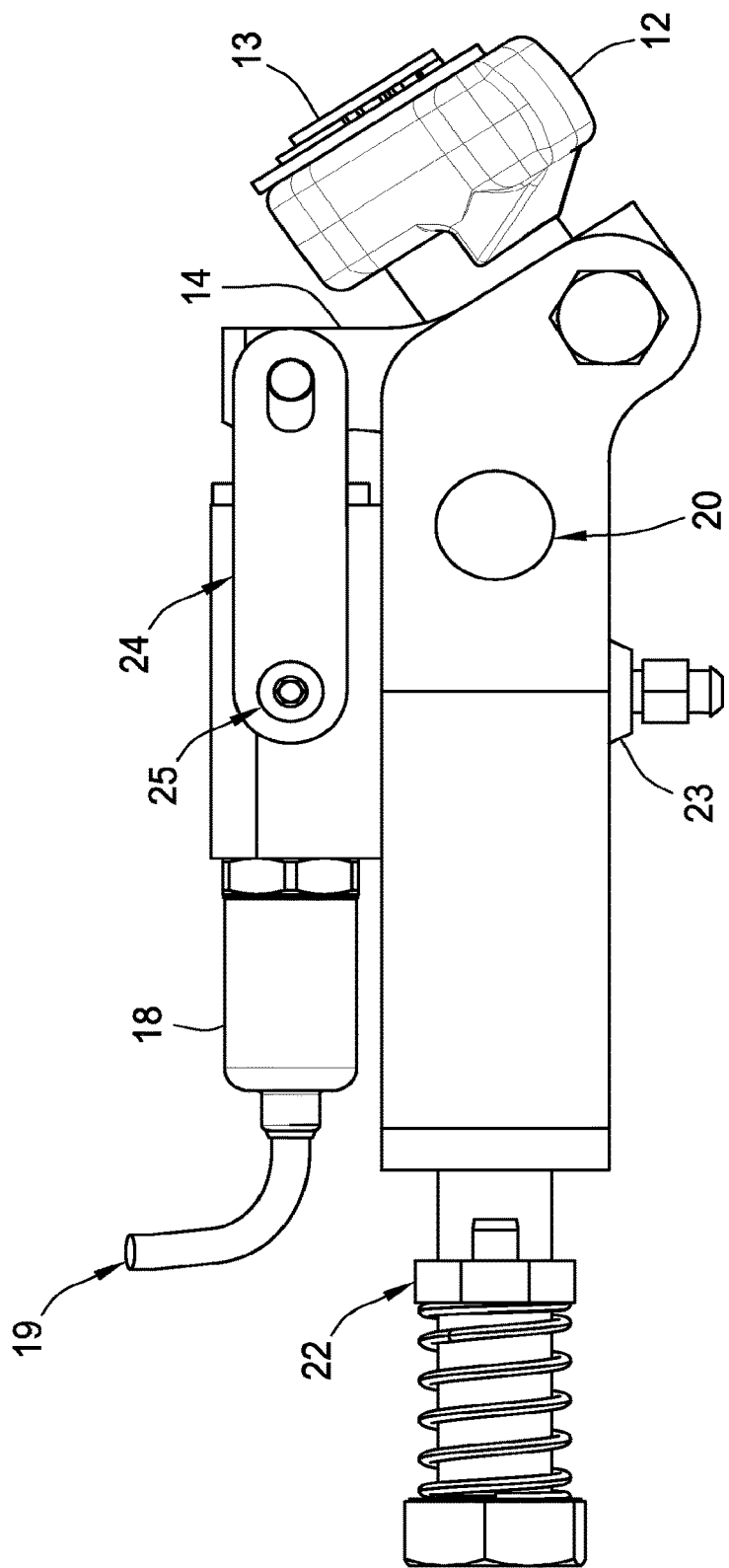
FIG. 4 is an enlarged side elevation of the equipment shown in FIG. 3.
Figure 5:
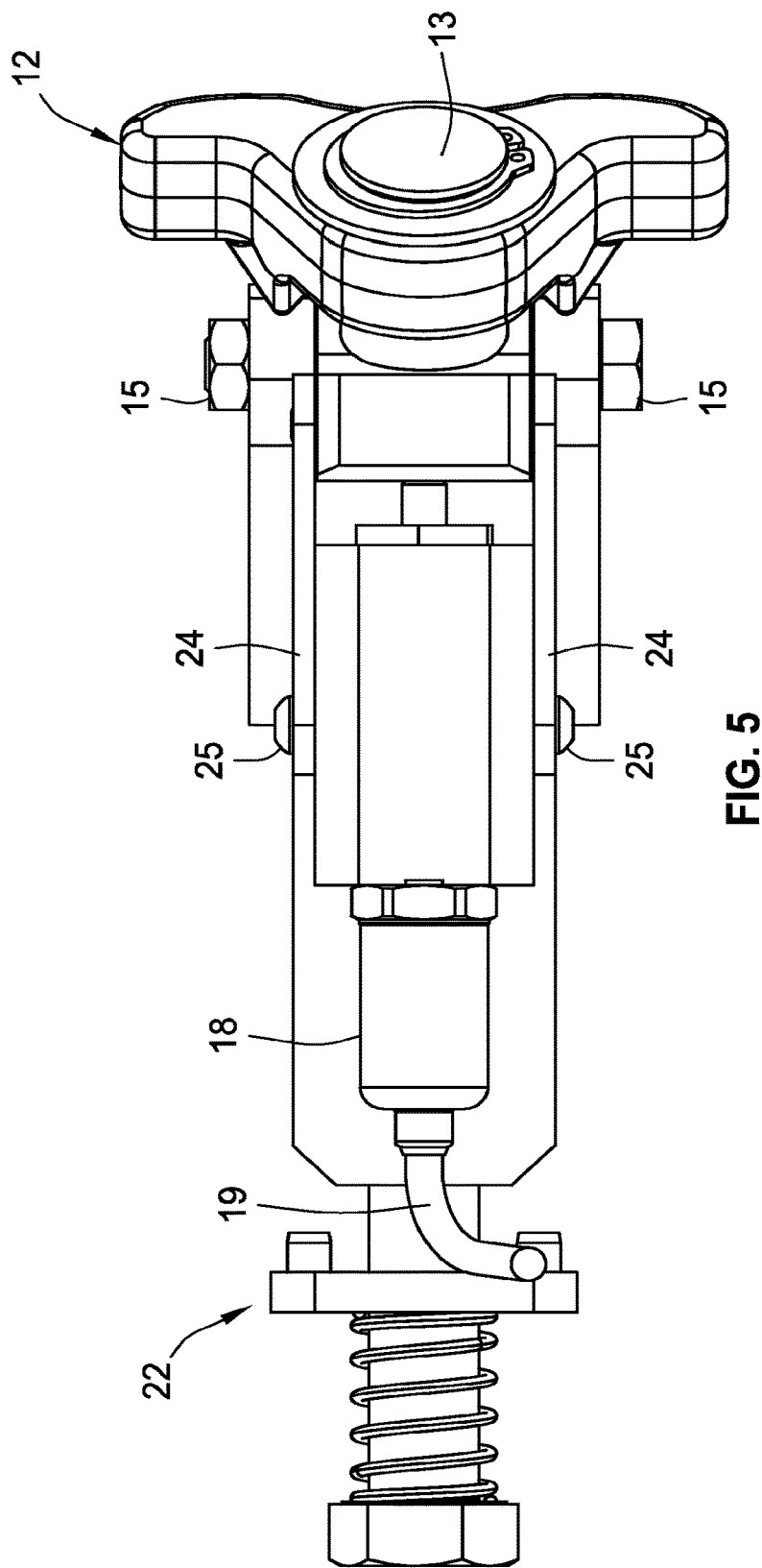
FIG. 5 is an enlarged top plan view of the equipment shown in FIG. 3.
Figure 6:
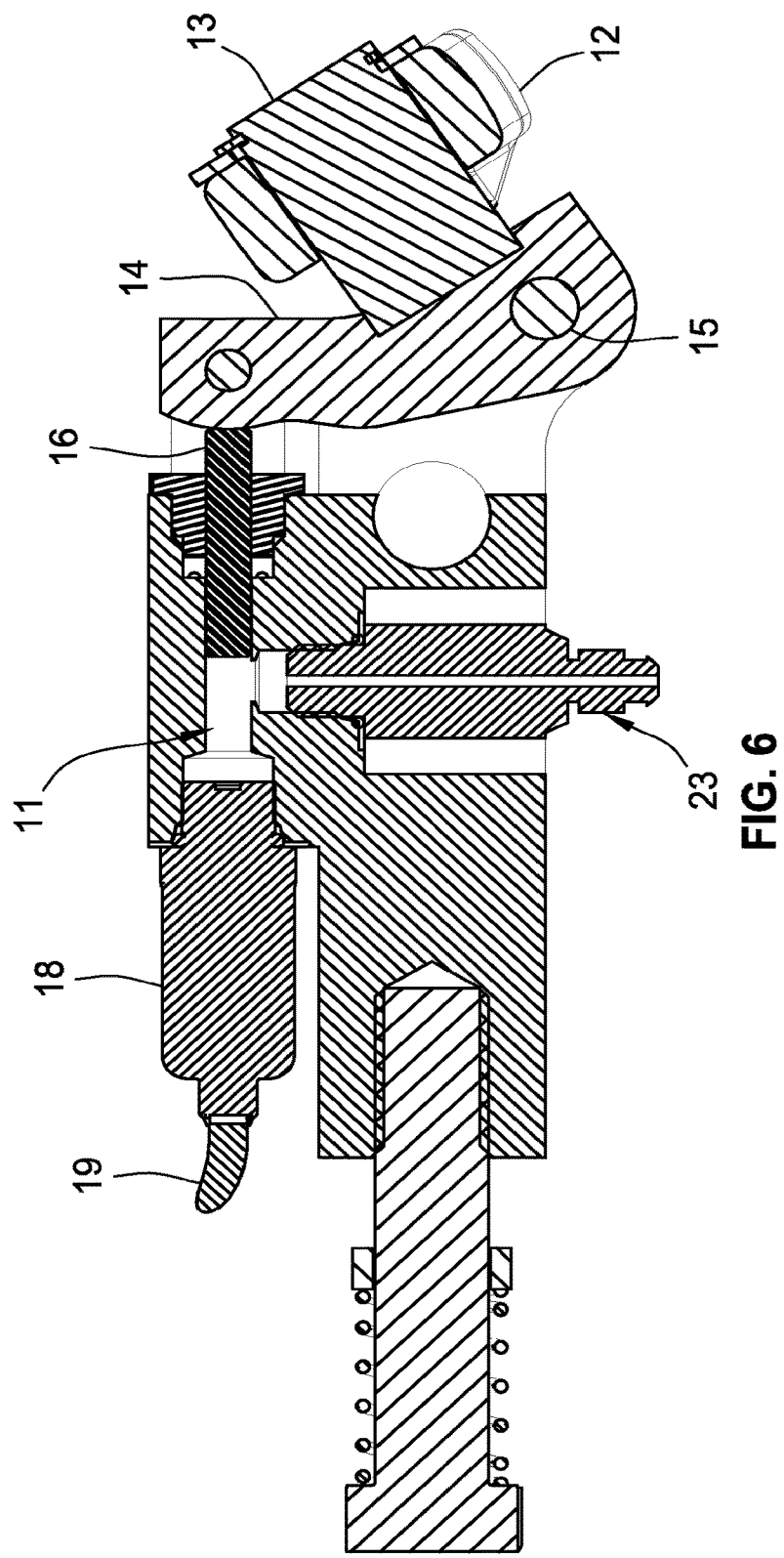
FIG. 6 is an enlarged vertical longitudinal section through the equipment shown in FIG. 3.

FIGS. 1-6 illustrate an improved gauge wheel load sensor that takes the upward force from a pivoting planter gauge wheel support, such as the pivoting support arms 10 in the row unit equipment shown in FIGS. 1 and 2, and translates that force into a fluid pressure in a fluid chamber 11. The gauge wheel support arms push against an equalizer support 12, which is connected via a pivot 13 with a rocker/cam 14. The force on the gauge wheel due to the weight of the row unit and applied down force causes the rocker/cam 14 to pivot around a pivot bolt 15 and push against a hydraulic ram 16. This force on the ram 16 causes the fluid in the chamber 11 to pressurize. The pressure is proportional to the amount of gauge wheel load. A pressure transducer 18 reads the amount of pressure and sends a signal to a row unit down pressure controller via signal line 19. This signal allows the planter row unit down pressure to be controlled to a desired level.

Depth adjustment is accomplished in the conventional sense by pivoting the assembly around a pivot 20, and locking a handle 21 into the desired position with a mechanism 22. With this design it is preferred that that there is no air trapped in the fluid chamber 11. For this reason the mechanism includes a bleed valve 23. The process for removal of air is to extend the ram to the maximum extent with calibration/travel limiter plates 24 (FIG. 4) removed. The system is then filled completely with fluid with the bleed valve 23 closed. Then the bleed valve 23 is opened, and the rocker arm 14 is pushed against the ram 16 to move the ram to the exact place where the calibration/travel limit plates 24 allow a calibration plate retaining screw 25 to fit into a hole. This ensures that each assembly is set the same so all the row units of the planter are at the same depth. At this point the bleed valve 23 is closed. With all air removed, the mechanical/fluid system will act as a rigid member against forces in compression. The travel limiter plate 24 keeps a cam pivot weldment from falling down when the planter is lifted off the ground.

Standard industry practice is to use a strain gauge to directly measure the planter gauge wheel load. The design shown in FIGS. 1-6 is an improvement over the state of the art because it allows the sensor to measure only the down force on the gauge wheels. In typical designs using strain gauge type sensors, the mechanical linkage that allows the gauge wheels to oscillate causes the measured wheel force to have substantial noise due to changes in the force being applied. For this reason it can be difficult to determine which parts of the signal correspond to actual changes in down force on the gauge wheels, versus signal changes that are due to movement of components of the gauge wheel support mechanism. The reason for this is that strain gauge sensors will only measure the force that is being applied in a single plane. Because of the linkage and pivot assembly that is used on typical planters, the force being applied to the strain gauge type designs can change based on the depth setting or whether the planter gauge wheels are oscillating over terrain. In this way they will tend to falsely register changes in gauge wheel down force and make it difficult to have a closed loop down pressure response remain consistent.

The fluid seal of the pressure sensor described here creates friction in the system which has the effect of damping out high frequency noise. Agricultural fields have very small scale variations in the surface which cause noise to be produced in the typical down force sensor apparatus. By using fluid pressure this invention decouples the sensor from the mechanical linkage and allows the true gauge wheel force to be more accurately measured. Lowering the amount of systematic noise in the gauge wheel load output sensor makes it easier to produce an automatic control system that accurately responds to true changes in the hardness of the soil, as opposed to perceived changes in soil hardness due to noise induced on the sensor.

Figure 7:
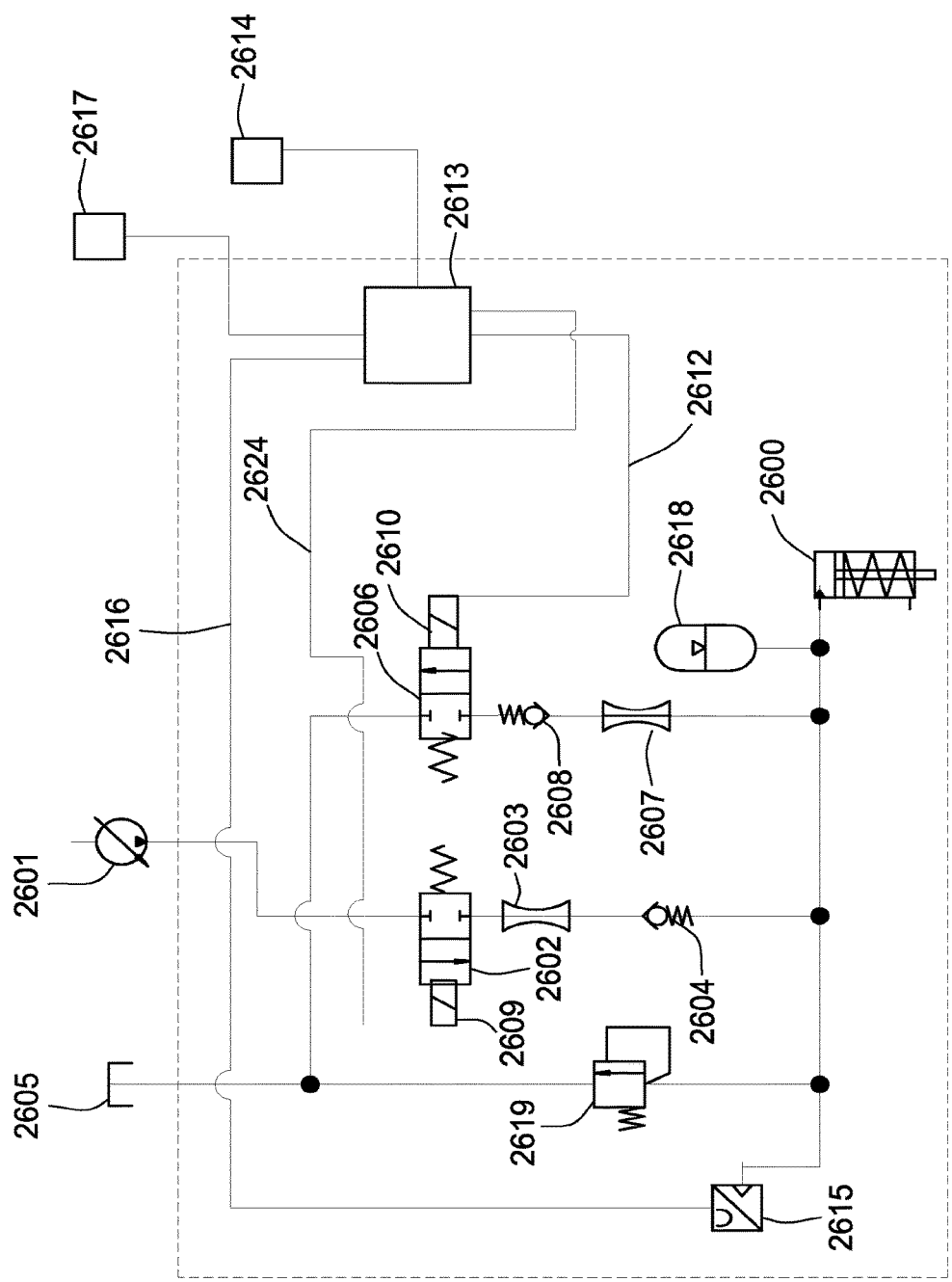
FIG. 7 is a schematic diagram of a hydraulic control system for controlling the hydraulic system using a gauge wheel load sensor.

FIG. 7 is a schematic diagram of a hydraulic control system for any or all of the hydraulic actuators in a down pressure control system. The hydraulic cylinder 2600 is supplied with pressurized hydraulic fluid from a source 2601 via a first controllable two-position control valve 2602, a restriction 2603 and a check valve 2604. The pressurized hydraulic fluid supplied to the cylinder 2600 can be returned from the cylinder to a sump 2605 via a second controllable two-position control valve 2606, a restriction 2607 and a check valve 2608. Both the control valves 2602 and 2606 are normally closed, but can be opened by energizing respective actuators 2609 and 2610, such as solenoids. Electrical signals for energizing the actuators 2609 and 2610 are supplied to the respective actuators via lines 2611 and 2612 from a controller 2613, which in turn may be controlled by a central processor 2614. The controller 2613 receives input signals from a plurality of sensors, which in the example of FIG. 7 includes a pressure transducer 2615 coupled to the hydraulic cylinder 2600 via line 2616, and a ground hardness sensor 2617. An accumulator 2618 is also coupled to the hydraulic cylinder 2600, and a relief valve 2619 connects the hydraulic cylinder 2600 to the sump 2605 in response to an increase in the pressure in the cylinder 2600 above a predetermined level.

To reduce the energy required from the limited energy source(s) available from the tractor or other propulsion device used to transport the row units over an agricultural field, the control valves 2602 and 2606 are preferably controlled with a pulse width modulation (PWM) control system implemented in the controller 2613. The PWM control system supplies short-duration (e.g., in the range of 50 milliseconds to 2 seconds with orifice sizes in the range of 0.020 to 0.2 inch) pulses to the actuators 2609 and 2610 of the respective control valves 2602 and 2606 to open the respective valves for short intervals corresponding to the widths of the PWM pulses. This significantly reduces the energy required to increase or decrease the pressure in the hydraulic cylinder 2600. The pressure on the exit side of the control valve is determined by the widths of the individual pulses and the number of pulses supplied to the control valves 2602 and 2606. Thus, the pressure applied to the hydraulic cylinder 2622 may be controlled by separately adjusting the two control valves 2602 and 2606 by changing the width and/or the frequency of the electrical pulses supplied to the respective actuators 2609 and 2610, by the controller 2613. This avoids the need for a constant supply current, which is a significant advantage when the only available power source is located on the tractor or other vehicle that propels the soil-engaging implement(s) across a field.

The hydraulic control system of FIG. 7 may be used to control multiple hydraulic cylinders on a single row unit or a group of row units, or may be replicated for each individual hydraulic cylinder on a row unit having multiple hydraulic cylinders. For example, in the system described above having a ground hardness sensor located out in front of the clearing wheels, it is desirable to have each hydraulic cylinder on any given row unit separately controlled so that the down pressure on each tool can be adjusted according to the location of that tool in the direction of travel. Thus, when the ground hardness sensor detects a region where the soil is softer because it is wet, the down pressure on each tool is preferably adjusted to accommodate the softer soil only during the time interval when that particular tool is traversing the wet area, and this time interval is different for each tool when the tools are spaced from each other in the direction of travel. In the case of a group of row units having multiple hydraulic cylinders on each row unit, the same hydraulic control system may control a group of valves having common functions on all the row units in a group.

Figure 8:
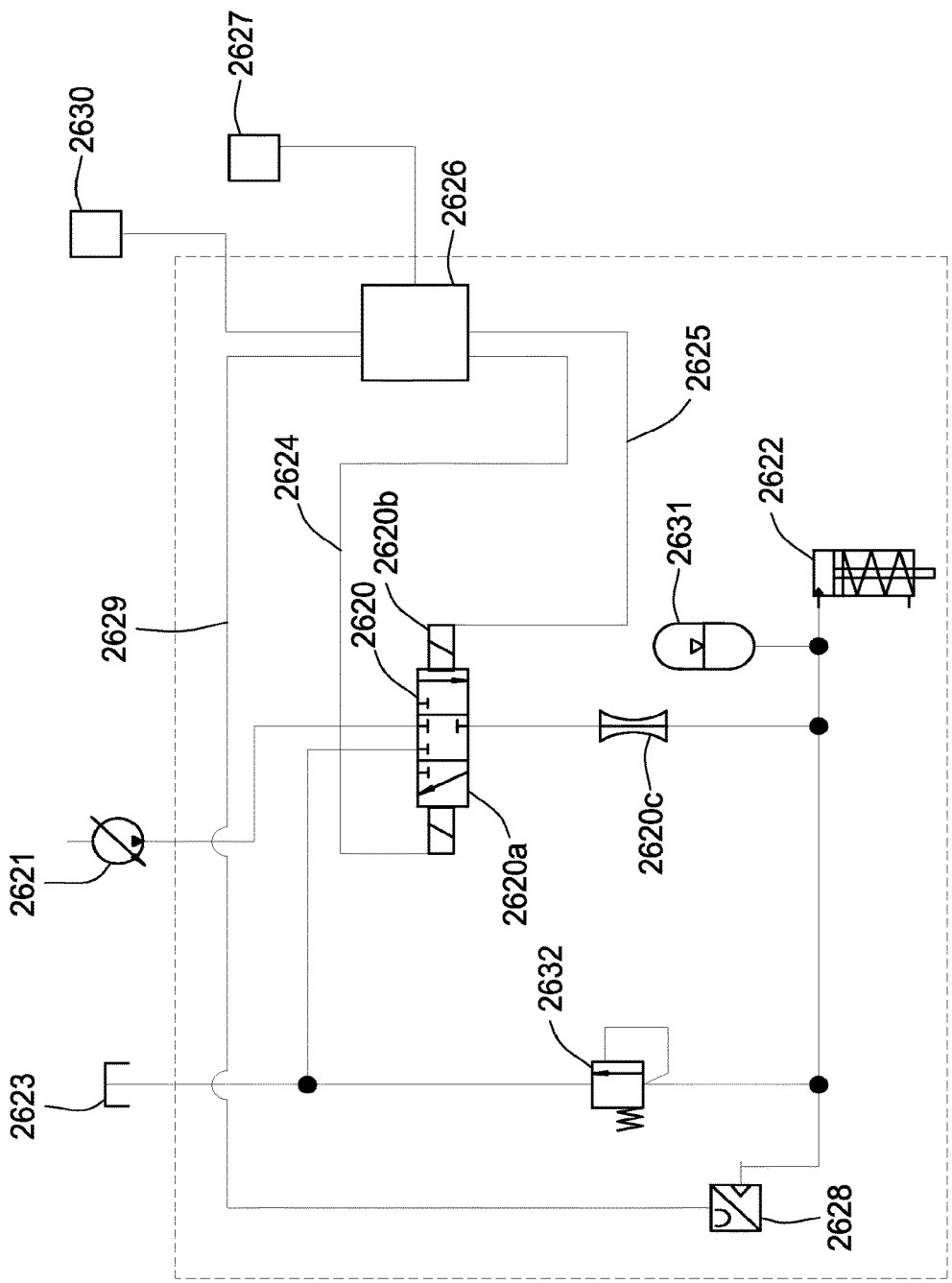
FIG. 8 is a schematic diagram of a modified hydraulic control system for controlling the hydraulic system using a gauge wheel load sensor.

FIG. 8 is a schematic diagram of a modified hydraulic control system that uses a single three-position control valve 2620 in place of the two two-position control valves and the two check valves used in the system of FIG. 7. The centered position of the valve 2620 is the closed position, which is the normal position of this valve. The valve 2620 has two actuators 2620a and 2620b, one of which moves the valve to a first open position that connects a source 2621 of pressurized hydraulic fluid to a hydraulic cylinder 2622 via restriction 2620c, and the other of which moves the valve to a second open position that connects the hydraulic cylinder 2622 to a sump 2623. Electrical signals for energizing the actuators 2620a and 2620b are supplied to the respective actuators via lines 2624 and 2625 from a controller 2626, which in turn may be controlled by a central processor 2627. The controller 2626 receives input signals from a pressure transducer 2628 coupled to the hydraulic cylinder 2622 via line 2629, and from an auxiliary sensor 2630, such as a ground hardness sensor. An accumulator 2631 is coupled to the hydraulic cylinder 2622, and a relief valve 2632 connects the hydraulic cylinder 2622 to the sump 2623 in response to an increase in the pressure in the cylinder 2622 above a predetermined level.

Figure 9:
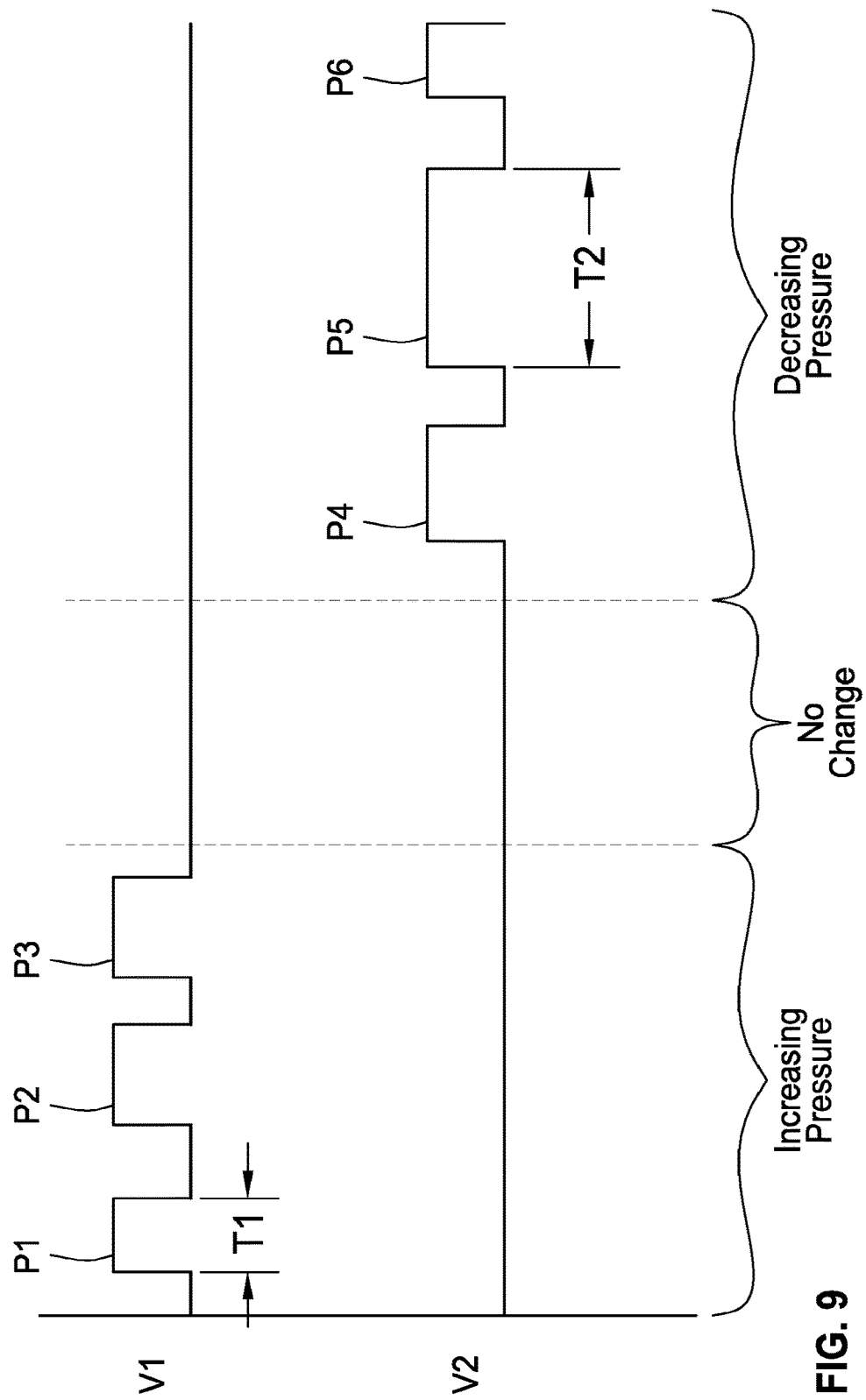
FIG. 9 is a waveform diagram illustrating different modes of operation provided by the hydraulic control systems of FIGS. 7 and 8.
Figure 10:
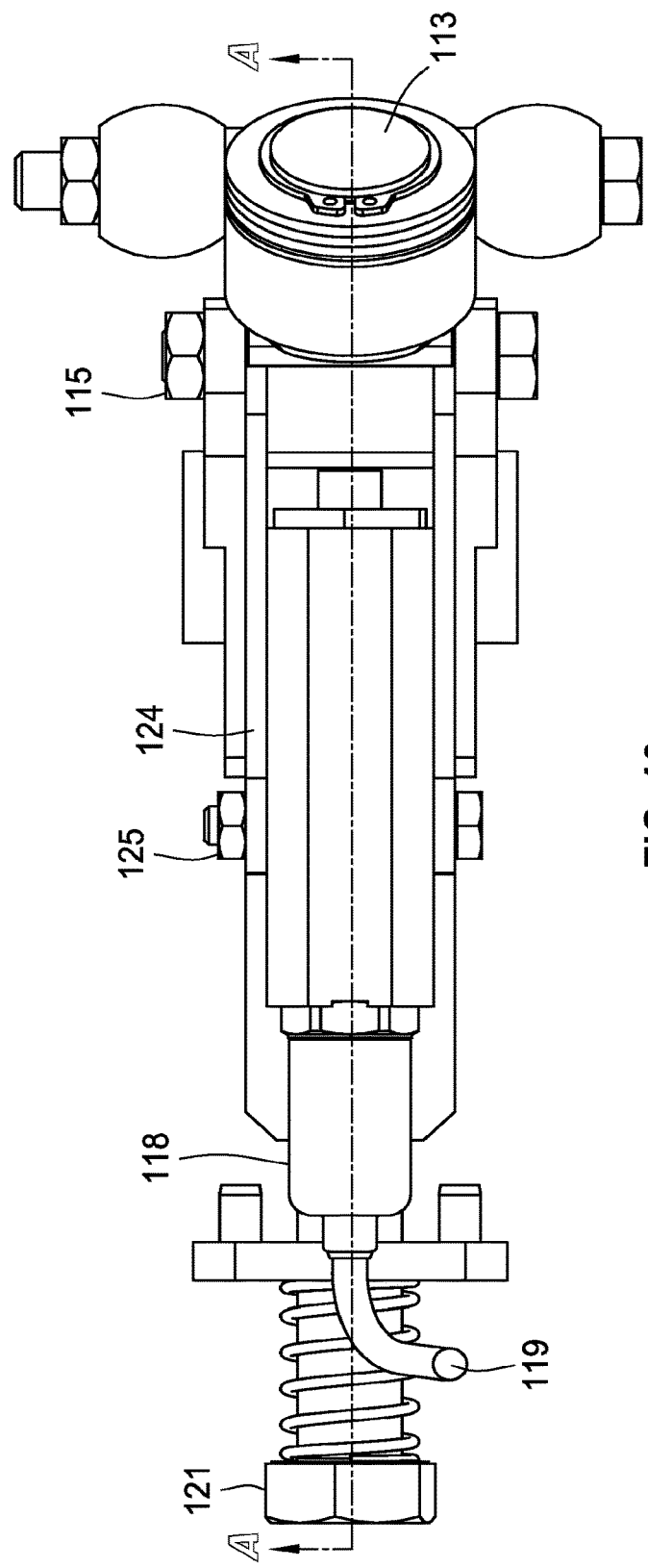
FIG. 10 is a plan view of a gauge wheel transducer system for an agricultural planter that includes a gauge wheel and an opener device.
Figure 11:
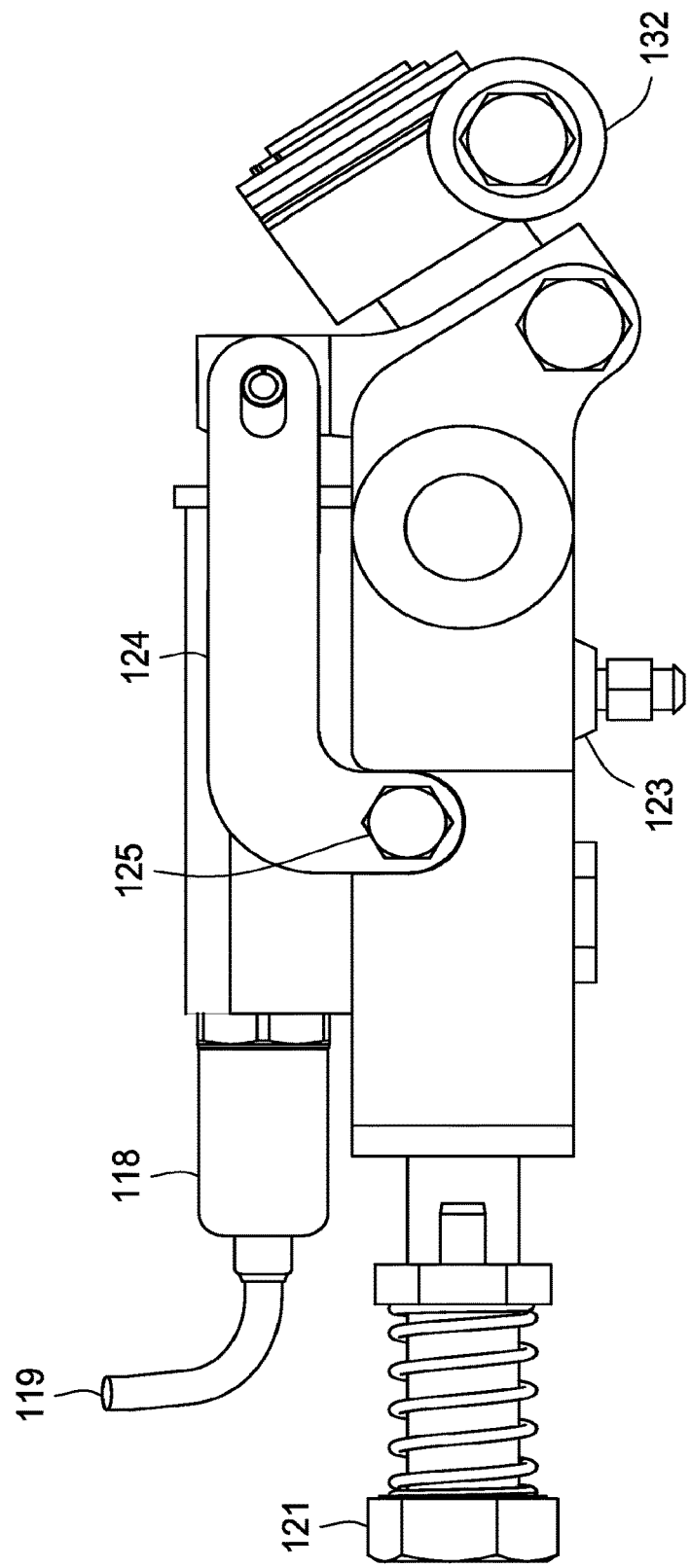
FIG. 11 is a side elevation of the transducer system shown in FIG. 10.
Figure 12:
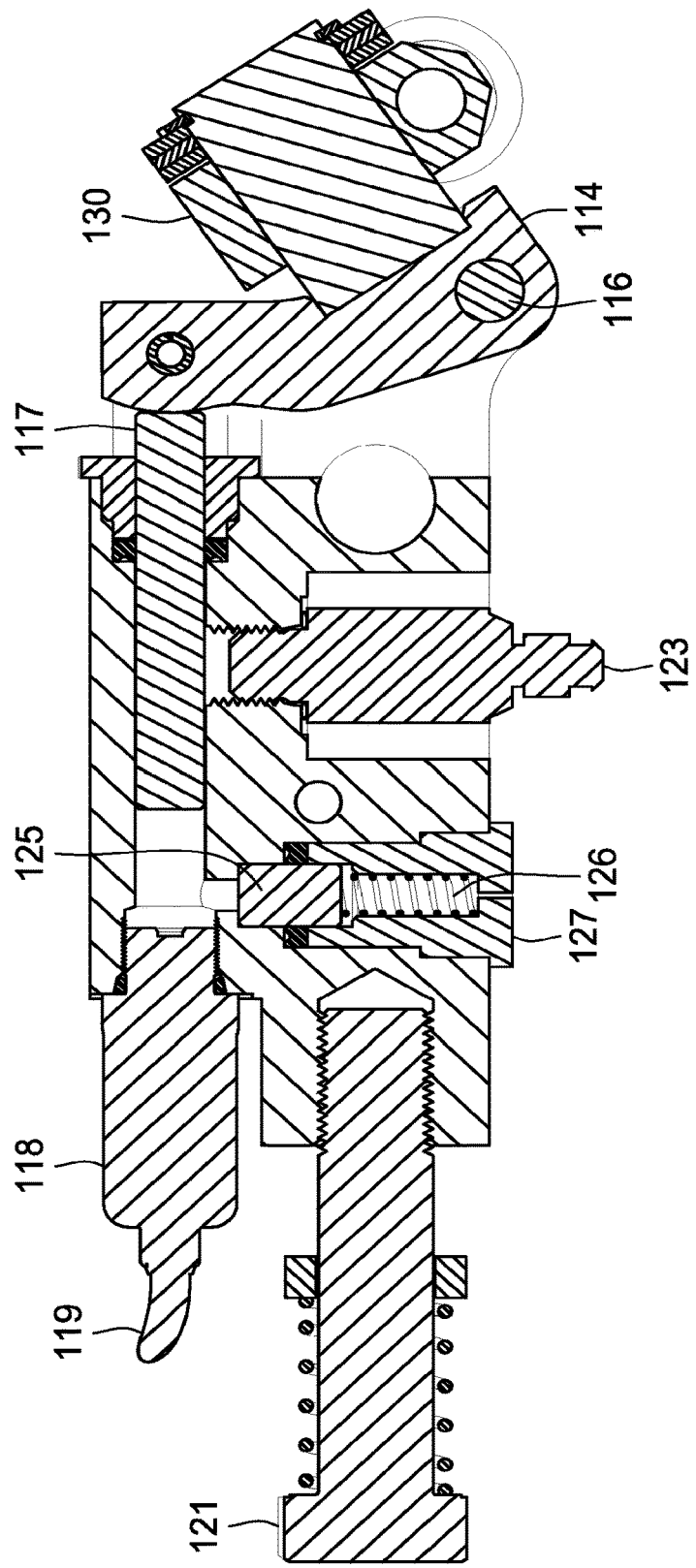
FIG. 12 is a sectional view taken along line A-A in FIG. 10.
Figure 13:
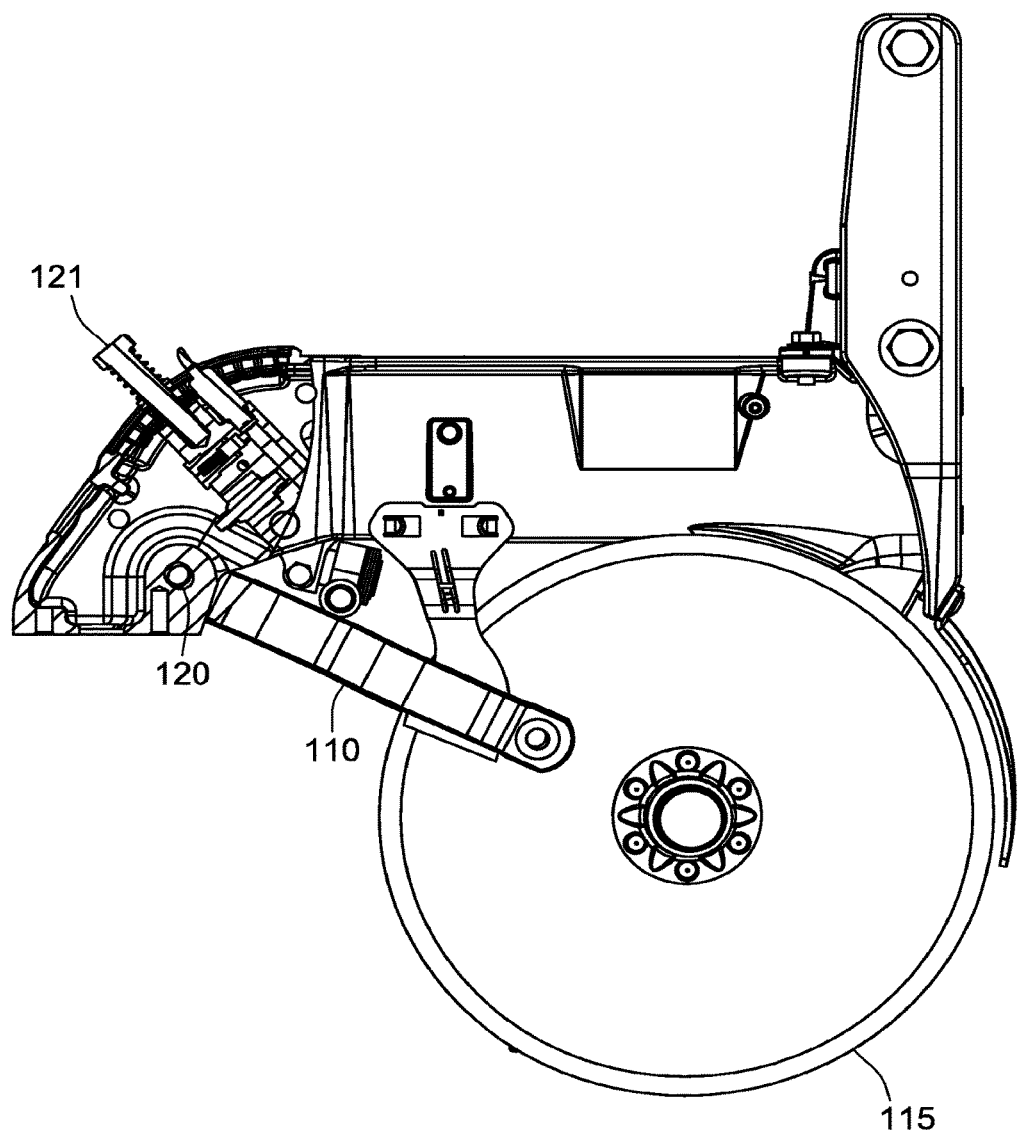
FIG. 13 is a side elevation, partially in section, of the transducer system of FIGS. 10-12 mounted on a gauge wheel and its supporting structure.
Figure 14:
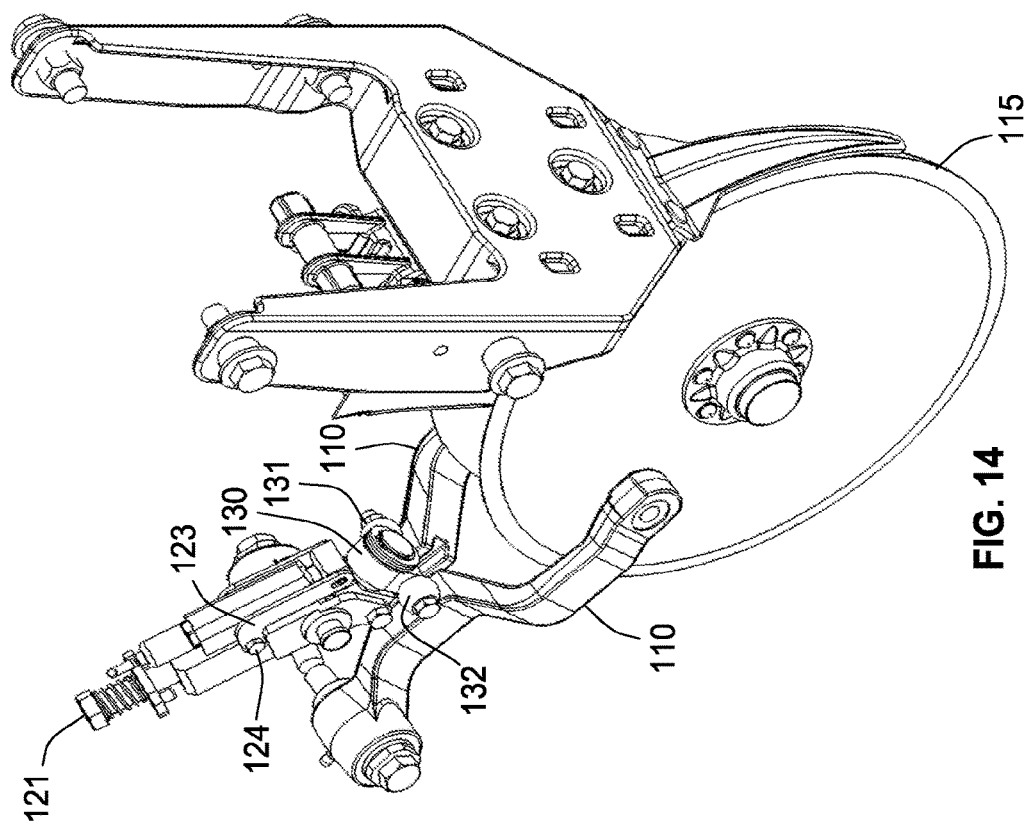
FIG. 14 is a perspective view of portions of the devices shown in FIG. 13.
Figure 15:
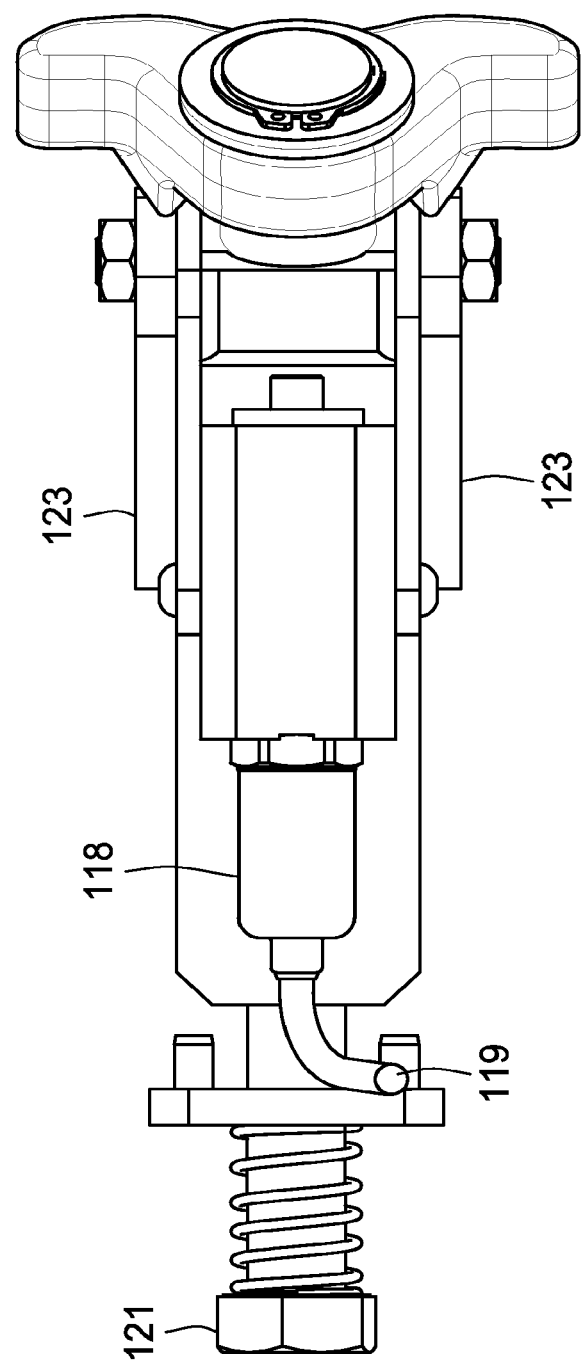
FIG. 15 is a plan view similar to FIG. 10 but with portions removed to show the equalizer arm.

As depicted in FIG. 9, a PWM control system supplies short-duration pulses P to the actuators 2620a and 2620b of the control valve 2620 to move the valve to either of its two open positions for short intervals corresponding to the widths of the PWM pulses. This significantly reduces the energy required to increase or decrease the pressure in the hydraulic cylinder 2622. In FIG. 9, pulses P1-P3, having a voltage level V1, are supplied to the actuator 2620b when it is desired to increase the hydraulic pressure supplied to the hydraulic cylinder 2622. The first pulse P1 has a width T1 which is shorter than the width of pulses P2 and P3, so that the pressure increase is smaller than the increase that would be produced if P1 had the same width as pulses P2 and P3. Pulses P4-P6, which have a voltage level V2, are supplied to the actuator 2620a when it is desired to decrease the hydraulic pressure supplied to the hydraulic cylinder 2622. The first pulse P4 has a width that is shorter than the width T2 of pulses P2 and P3, so that the pressure decrease is smaller than the decrease that would be produced if P4 had the same width as pulses P5 and P6. When no pulses are supplied to either of the two actuators 2620a and 2620b, as in the "no change" interval in FIG. 9, the hydraulic pressure remains substantially constant in the hydraulic cylinder 2622.

FIGS. 10-15 illustrate a modified gauge wheel load sensor that includes an integrated accumulator 122. The purpose of the accumulator 122 is to damp pressure spikes in the sensor when the planter is operating at low gauge wheel loads. When the forces that the gauge wheel support arms 110 are exerting on the hydraulic ram 117 are near zero, it is more common for the surface of the soil or plant residue to create pressure spikes that are large in relation to the desired system sensor pressure. These pressure spikes produce corresponding changes in the vertical position (elevation) of the gauge wheels. As the target gauge wheel down force increases, and consequently the pressure in the fluid chamber 111 and the transducer output voltage from sensor 118, the small spikes of pressure due to variations in the soil surface or plant residue decrease proportionally.

In the present system, rather than have a perfectly rigid fluid coupling between the ram 117 and the pressure transducer 118, as load increases on the ram 117, the fluid first pushes against a piston 125 of the accumulator 122 that is threaded into a side cavity 123 in the same housing that forms the main cavity for the ram 117. The increased pressure compresses an accumulator spring 126 until the piston 125 rests fully against a shoulder on the interior wall of the accumulator housing 127, thus limiting the retracting movement of the accumulator piston 125. At this point, the system becomes perfectly rigid. The amount of motion permitted for the accumulator piston 125 must be very small so that it does not allow the depth of the gauge wheel setting to fluctuate substantially. The piston accumulator (or other energy storage device) allows the amount of high frequency noise in the system to be reduced at low gauge-wheel loads. Ideally an automatic down pressure control system for an agricultural planter should maintain a down pressure that is as low as possible to avoid over compaction of soil around the area of the seed, which can inhibit plant growth. However, the performance of most systems degrades as the gauge wheel load becomes close to zero, because the amount of latent noise produced from variation in the field surface is large in relation to the desired gauge wheel load.

Planter row units typically have a gauge wheel equalizer arm 130 that is a a single unitary piece. It has been observed that the friction between the equalizer arm 130 and the gauge wheel support arms 110, as the gauge wheel 115 oscillates up and down, can generate a substantial amount of noise in the sensor. At different adjustment positions, the edges of the equalizer arm 130 contact the support arms 10 at different orientations and can bite into the surface and prevent forces from being smoothly transferred as they increase and decrease. When the equalizer arm 130 is a single unitary piece, there is necessarily a high amount of friction that manifests itself as signal noise in the sensor. This signal noise makes it difficult to control the down pressure system, especially at low levels of gauge wheel load.

Figure 16:
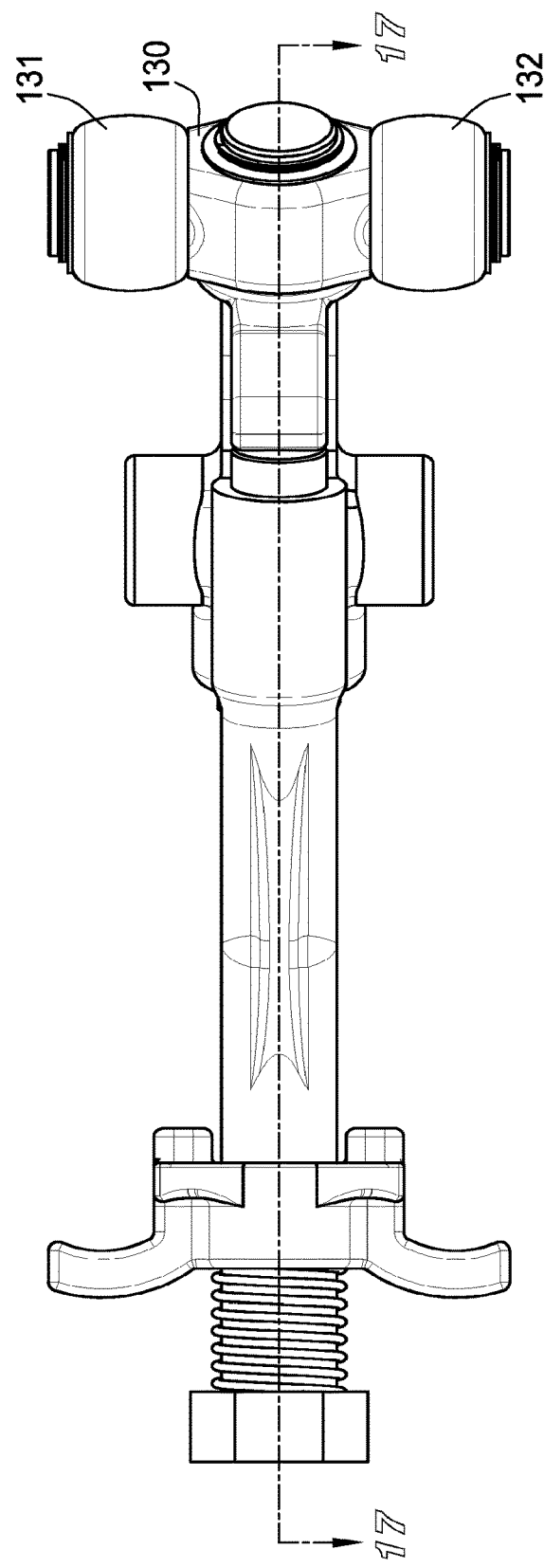
FIG. 16 is a plan view of a modified transducer system.

To alleviate this situation, the equalizer arm 130 illustrated in FIG. 16 has a pair of contact rollers 131 and 132 are mounted on opposite ends of the equalizer arm. These rollers 131 and 132 become the interface between the equalizer arm and the support arms 110, allowing forces to be smoothly transferred between the support arms 110 and the equalizer arm 130. The roller system allows the gauge wheel support arms 110 to oscillate relative to each other without producing any sliding friction between the support arms 110 and the equalizer arm 130. This significantly reduces the friction that manifests itself as signal noise in the sensor output, which makes it difficult to control the down pressure control system, especially at low levels of gauge wheel load.

Figure 17:
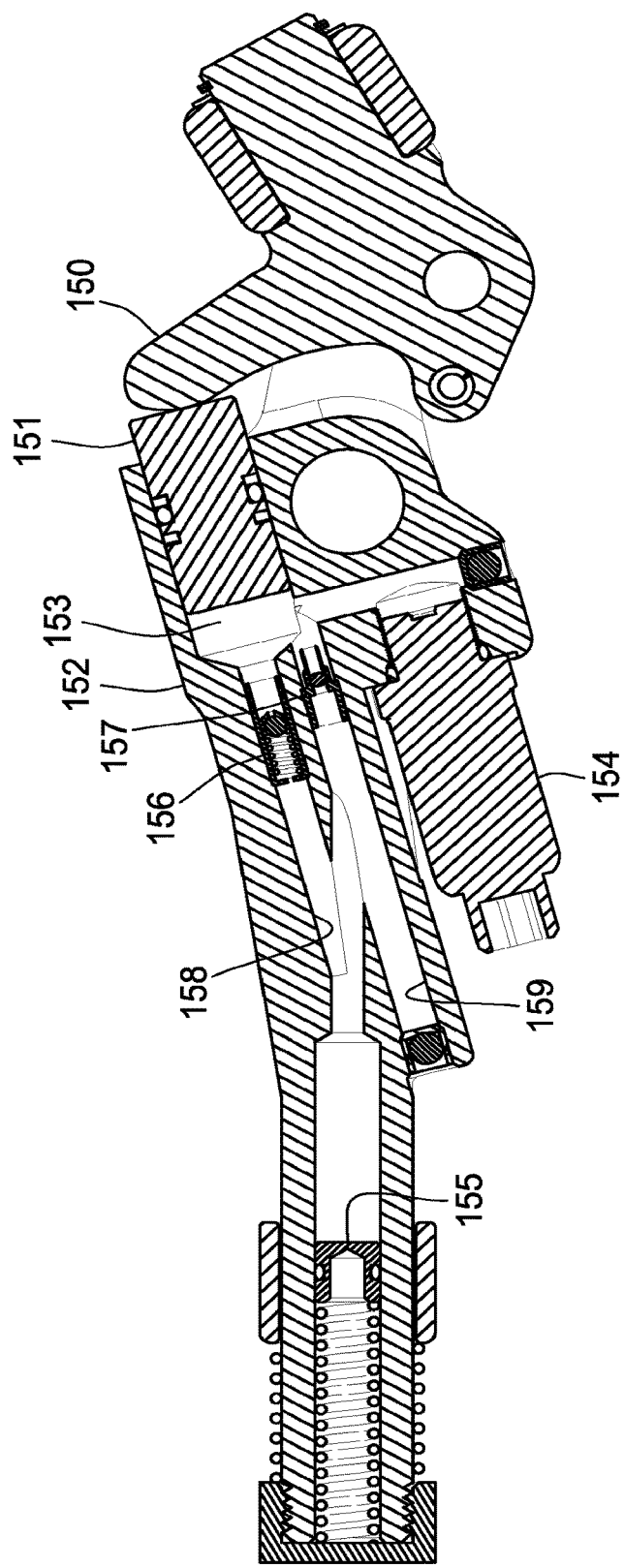
FIG. 17 is a longitudinal section taken along line 17-17 in FIG. 16.

FIG. 17 is a longitudinal section through the device of FIG. 16, with the addition of a rocker arm 150 that engages a ram 151 that controls the fluid pressure within a cylinder 152. A fluid chamber 153 ladjacent the inner end of the ram 151 opens into a lateral cavity that contains a pressure transducer 154 that produces an electrical output signal representing the magnitude of the fluid pressure in the fluid chamber 153. The opposite end of the cylinder 152 includes an accumulator 155 similar to the accumulator 125 included in the device of FIG. 9 described above. Between the fluid chamber 153 and the accumulator 155, a pair of valves 156 and 157 are provided in parallel passages 158 and 159 extending between the chamber 153 and the accumulator 155. The valve 156 is a relief valve that allows the pressurized fluid to flow from the chamber 153 to the accumulator 155 when the ram 151 advances farther into the chamber 153. The valve 157 is a check valve that allows pressurized fluid to flow from the accumulator 155 to the chamber 153 when the ram 151 moves outwardly to enlarge the chamber 153. The valves 156 and 157 provide overload protection (e.g., when one of the gauge wheels hits a rock) and to ensure that the gauge wheels retain their elevation setting.

FIGS. 18A and 18B illustrate a modified sensor arrangement for a pair of gauge wheels 160 and 161 rolling on opposite sides of a furrow 162. The two gauge wheels are independently mounted on support arms 163 and 164 connected to respective rams 165 and 166 that control the fluid pressure in a pair of cylinders 167 and 168. A hydraulic hose 169 connects the fluid chambers of the respective cylinders 167 and 168 to each other and to a common pressure transducer 170, which produces an electrical output signal corresponding to the fluid pressure in the hose 169. The output signal is supplied to an electrical controller that uses that signal to control the down forces applied to the two gauge wheels 160 and 161. It will be noted that the two gauge wheels can move up and down independently of each other, so the fluid pressure sensed by the transducer 170 will be changed by vertical movement of either or both of the gauge wheels 160 and 161.

Figure 20:
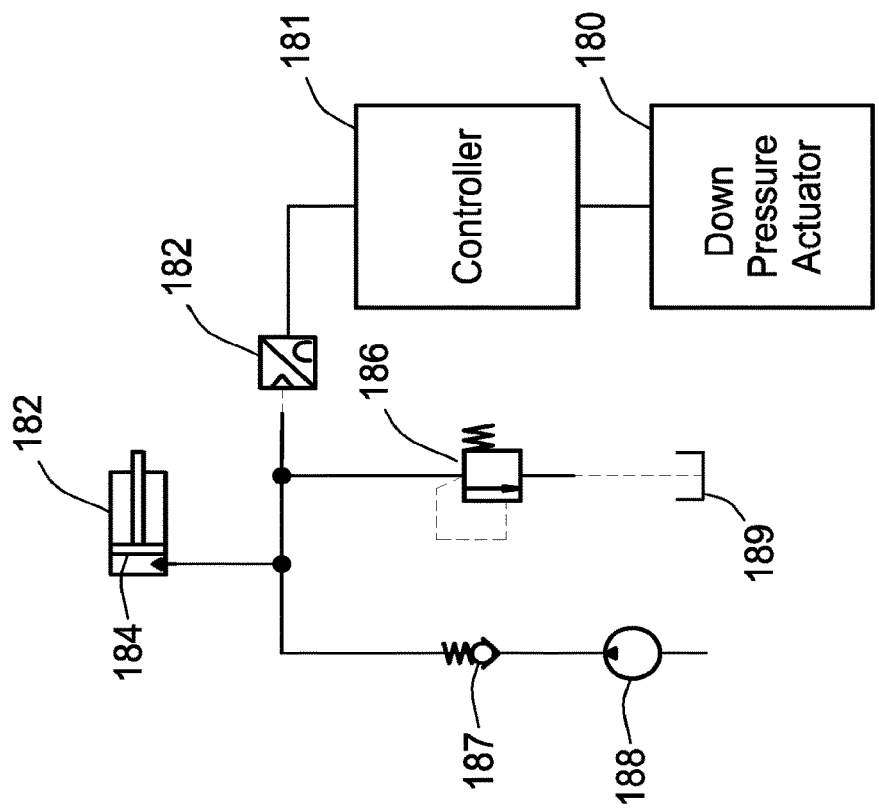
FIG. 20 is a schematic diagram of a first modified hydraulic and electrical control system for controlling a down pressure actuator.
Figure 19:
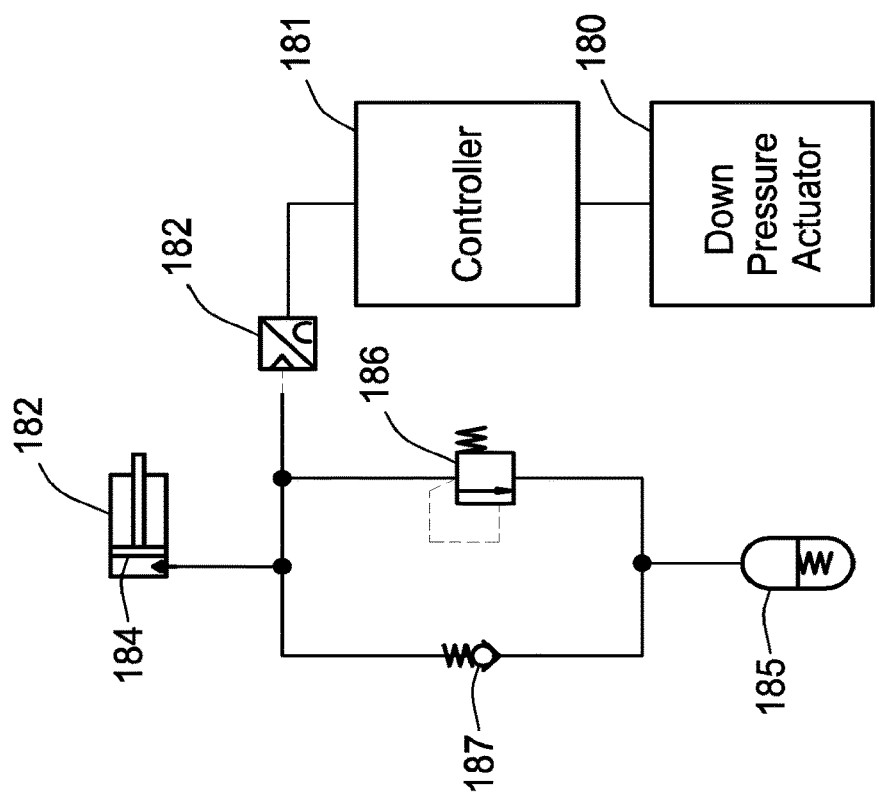
FIG. 19 is a schematic diagram of a hydraulic and electrical control system for controlling a down pressure actuator.

FIGS. 19-22 illustrate electrical/hydraulic control systems that can be used to control a down-pressure actuator 180 in response to the electrical signal provided to a controller 181 by a pressure transducer 182. In each system the transducer 182 produces an output signal that changes in proportion to changes in the fluid pressure in a cylinder 183 as the position of a ram 184 changes inside the cylinder 183. In FIG. 19, the pressurized fluid chamber in the cylinder 183 is coupled to an accumulator 185 by a relief valve 186 to allow pressurized fluid to flow to the accumulator, and by a check valve 187 to allow return flow of pressurized fluid from the accumulator to the cylinder 183. In FIG. 20, the accumulator 185 is replaced with a pressurized fluid source 188 connected to the check valve 187, and a sump 189 connected to the relief valve 186. In FIG. 21, the accumulator 185 is connected directly to the pressurized fluid chamber in the cylinder 183, without any intervening valves. In the system of FIG. 22, there is no accumulator, and the pressure sensor 182 is connected directly to the pressurized fluid chamber in the cylinder 183.

Figure 23:
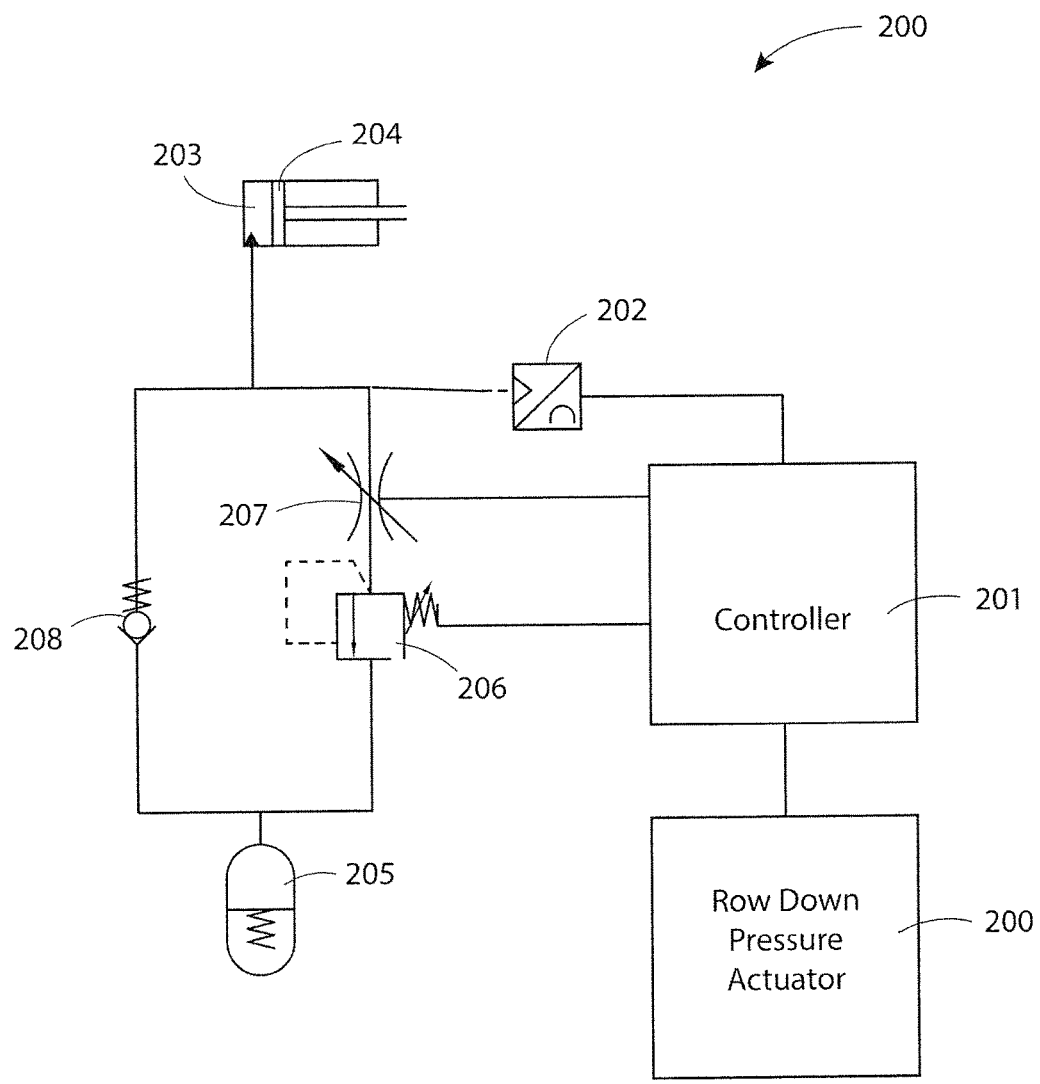
FIG. 23 is a schematic diagram of a fourth modified hydraulic and electrical control system for controlling a down pressure actuator.

FIG. 23 illustrates a modified electrical/hydraulic control system for controlling a down-pressure actuator 200 in response to an electrical signal provided to a controller 201 by a pressure transducer 202. The transducer 202 produces an output signal that changes in proportion to changes in the fluid pressure in a cylinder 203 as the position of a ram 204 changes inside the cylinder 203. Thus the ram 204 functions as a gauge wheel sensor. The pressurized fluid chamber in the cylinder 203 is coupled to an accumulator 205 by a controllable valve 206 to allow pressurized fluid to flow to the accumulator 205 through a controllable variable orifice 207, and by a check valve 208 to allow return flow of pressurized fluid from the accumulator 205 to the cylinder 203.

When the force applied to the piston 204, e.g., by the rocker arm 14, increases when the ground-engaging implement encounters harder ground or strikes a rock, the piston 204 is moved to the left. This causes a portion of the pressurized fluid to flow through the variable orifice 207 and the relief valve 206 to the accumulator 205. Both the variable orifice 207 and the relief valve 206 are controlled by electrical control signals from the controller 201, which receives the output signal from the pressure sensor 202.

The variable orifice 207 acts as an adjustable and controllable damper affecting the stiffness of, for example, a planter gauge wheel suspension. Also, the electro-proportional relief valve 206 allows the stiffness of, for example, a planter row unit ride to be changed dynamically. For example, the controller 201 can be programmed to allow a stiffer setting or higher relief pressure in smooth fields. In rougher fields, the relief pressure can be reduced to allow more travel of the gauge wheels relative to the opener disks. This results in less bouncing of the row unit. The amount of variation in the pressure sensor output signal reflects variations in the roughness of the field. The controller can use this variation or smoothness of the pressure signal over time to control the relief pressure in real time.

When the force applied to the piston is reduced, the fluid pressure within the cylinder 203 is reduced, and the accumulator causes a portion of the fluid to flow back into the cylinder 203 via the check valve 208. The reduced pressure is sensed by the pressure sensor 202, which produces a corresponding change in the sensor output signal supplied to the controller 201.

Figure 24:
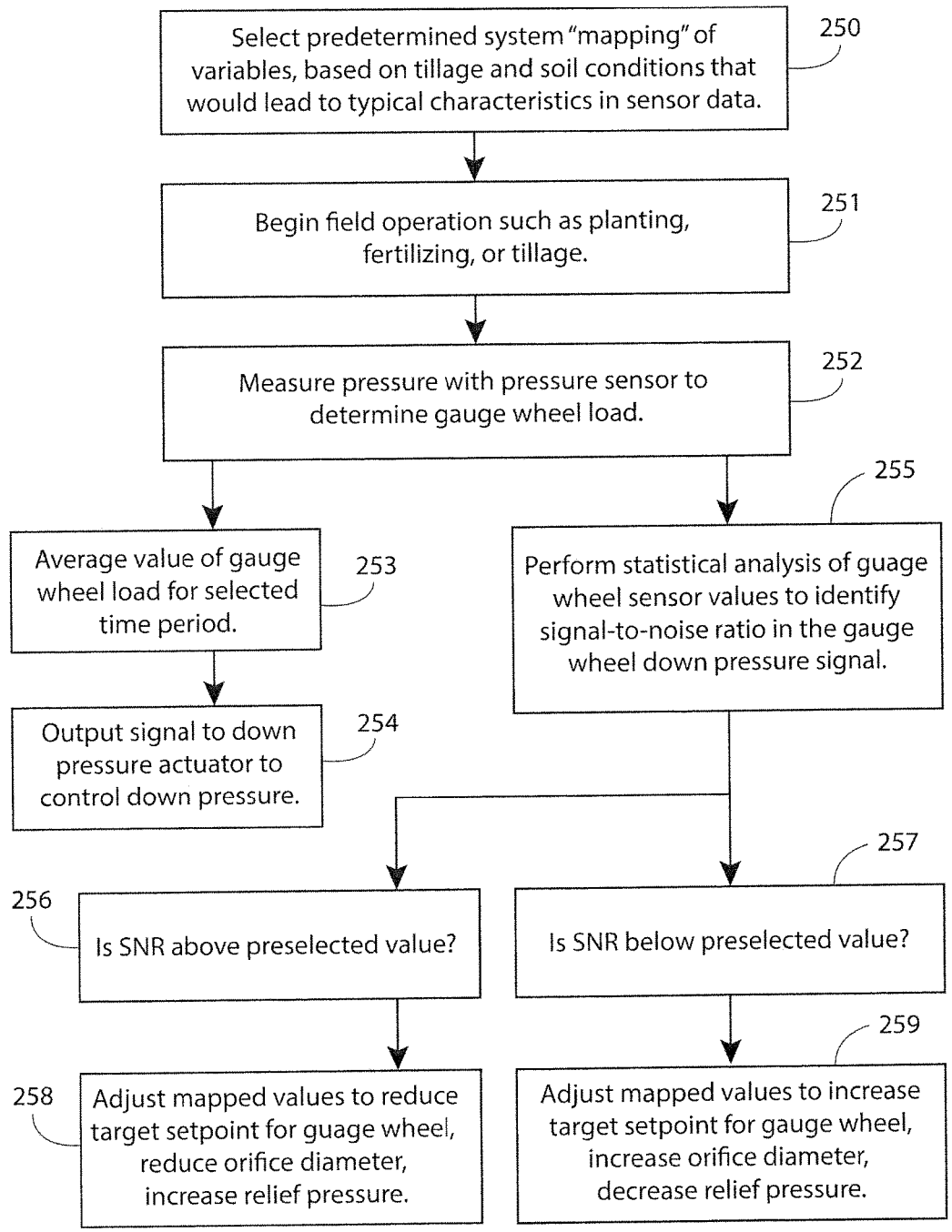
FIG. 24 is a flow chart of an exemplary algorithm executed by the controller in the system of FIG. 23.

The controller 201 is programmed with an algorithm represented by the flow chart in FIG. 24. The first step 250 selects a predetermined system "mapping" of variables such as the diameter of the variable orifice 207 and relief pressure in the cylinder 203. Other variables such as the down pressure control system set point can be included in the mapping. The mapping is based on tillage and soil conditions that lead to typical characteristics in the sensor data. After the mapping of the selected variables, a field operation such as planting, fertilizing or tillage, is started at step 251, and at step 252 the pressure transducer 202 supplies the controller 201 with a signal that varies with the fluid pressure in the cylinder 203, which corresponds to changes in the gauge wheel load. The controller 201 computes a running average value of the gauge wheel load for a selected time period at step 253, and at step 254 supplies a control signal to the down-pressure actuator 200 to control the down pressure in a closed loop.

In parallel with the closed loop control of the down-pressure actuator 200, the controller also adjusts the values of the mapped variables in steps 255-259. Step 255 performs a statistical analysis of the gauge wheel sensor values to determine the signal-to-noise ratio ("SNR"), of the level of the desired signal to the level of background noise in the gauge wheel down pressure signal. The SNR can be determined by any of the known standard procedures, such as determining the ratio of the arithmetic mean to the standard deviation. The controller then determines whether the current SNR is above or below a reselected value, at steps 256 and 257. If the SNR is determined to be above the preselected value at step 256, step 258 adjusts the mapped values to reduce the target set point and the orifice diameter and to increase the relief pressure. If the SNR is below the preselected value at step 257, step 259 adjusts the mapped values to increase the target set point and the orifice diameter and to decrease the relief pressure.

Figure 25:
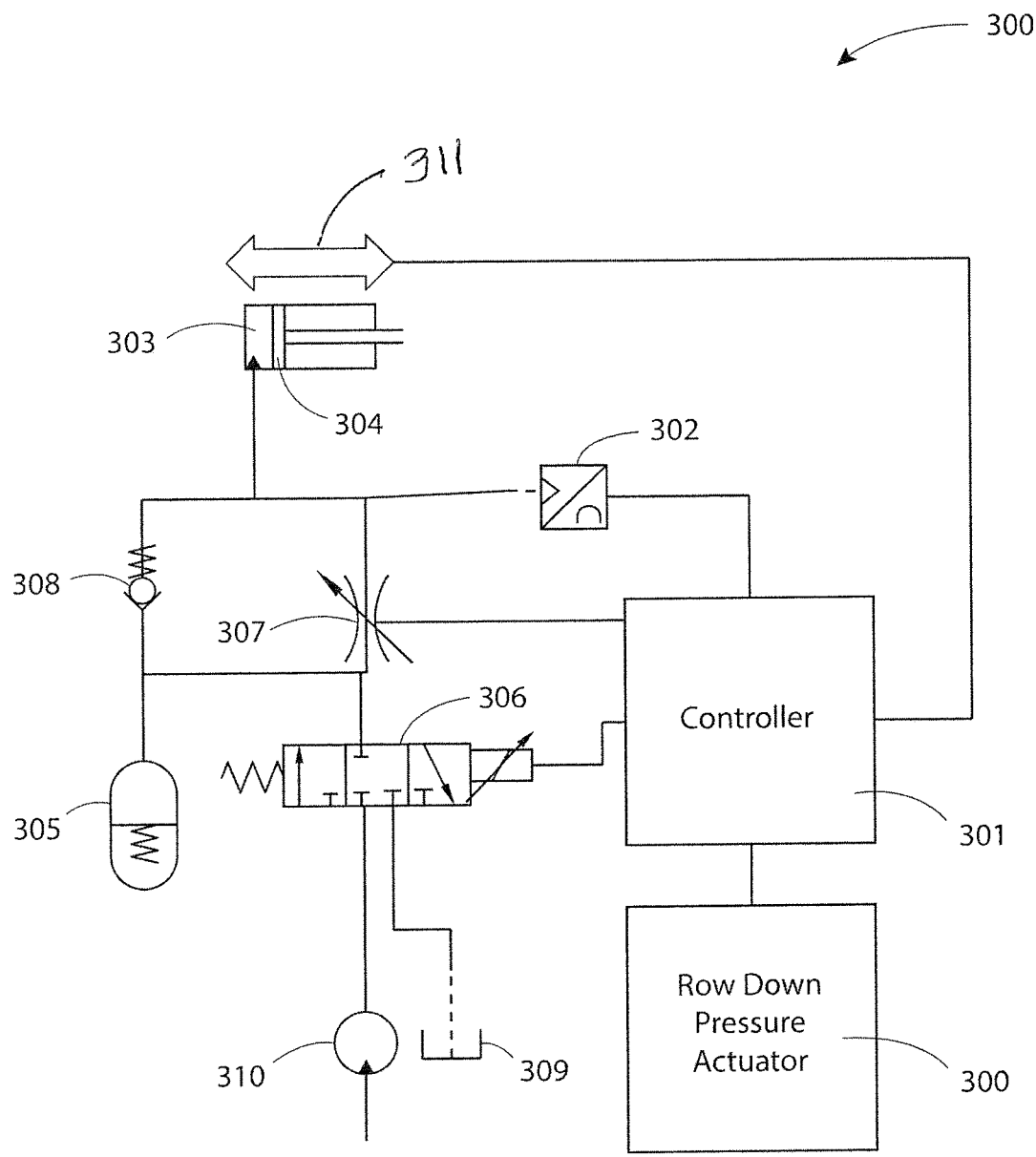
FIG. 25 is a schematic diagram of a fifth modified hydraulic and electrical control system for controlling a down pressure actuator.

FIG. 25 illustrates a modified control system in which the relief valve 206 is replaced with a controllable 3-way valve 306, and a sump 309 and a pressure supply pump 310 are connected to the valve 306. This control system also includes a position sensor 312, such as an inductive sensor or a linear encoder, which supplies the controller 301 with a signal representing the position of the piston 304 within the cylinder 303. The signal from the position sensor 302 enables the controller 301 to identify in real time the depth of the opener relative to the gauge wheel.

When the 3-way valve 306 is in its center position, as shown in FIG. 25, the cylinder 303 is disconnected from both the sump 309 and the pump 310, and thus the cylinder 303 is coupled to the accumulator 305 via the variable orifice 307. This is the normal operating position of the valve 306. When the controller 301 produces a signal that moves the valve 306 to the right, the valve connects the cylinder 303 to the pressure supply pump 310 to increase the fluid pressure in the cylinder 303 to a desired level. When the controller 301 produces a signal that moves the valve 306 to the left, the valve connects the cylinder 303 to the sump 309 to relieve excessive pressure in the cylinder 303.

The system in FIG. 25 allows active control of the depth of the ground-engaging element by using the pressure control valve 306 to change the pressure in the cylinder 303. Because the piston 304 is connected to the gauge wheel arms via the rocker, the gauge wheels move relative to the opener disks as the piston 304 moves in and out.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

The invention claimed is:

1. A gauge wheel load sensor for an agricultural planter having a row unit that includes a pivotably mounted gauge wheel and a down pressure controller for controlling a down pressure applied on at least a portion of the row unit, the load sensor comprising:
a mechanical element mounted for movement in response to the down pressure applied on the at least a portion of the row unit;
a fluid-containing device containing a movable element coupled to the mechanical element for changing the fluid pressure in the fluid-containing device in response to the movement of the mechanical element; and
a transducer coupled to the fluid-containing device for producing an output signal in response to changes in the fluid pressure, the transducer providing the output signal to the down pressure controller for controlling the down pressure applied on the at least a portion of the row unit.

2. The gauge wheel load sensor of claim 1, wherein the mechanical element is a rocker arm coupled to said gauge wheel, the fluid-containing device is a hydraulic cylinder and the movable element is a ram in the hydraulic cylinder, the rocker arm being coupled to the gauge wheel such that the fluid pressure on the ram within the hydraulic cylinder is adjusted in response to vertical movement of the gauge wheel.

3. The gauge wheel load sensor of claim 2, wherein in which the fluid pressure on the ram is increased only in response to a change in the down pressure applied on the gauge wheel.

4. The gauge wheel load sensor of claim 1, further comprising an accumulator coupled to a portion of the fluid-containing device where the fluid pressure increases in response to the movement of the movable element.

5. The gauge wheel load sensor of claim 4, wherein the fluid-containing device is coupled to the accumulator via a controllable valve for allowing pressurized fluid to flow to the accumulator through a controllable variable orifice.

6. The gauge wheel load sensor of claim 5, wherein the fluid-containing device is further coupled to the accumulator via a check valve for allowing return flow of pressurized fluid from the accumulator to the fluid-containing device.

7. The gauge wheel load sensor of claim 4, wherein the accumulator damps changes in the fluid pressure in response to vibratory movement of the movable element, the movable element being a ram within the fluid-containing device.

8. The gauge wheel load sensor of claim 1, further comprising an accumulator coupled to the fluid-containing device via a controllable valve having a controllable variable orifice for allowing pressurized fluid to flow to the accumulator, the accumulator further being coupled to the fluid-containing device via a check valve for allowing return flow of pressurized fluid from the accumulator to the fluid-containing device.

9. The gauge wheel load sensor of claim 8, wherein the down pressure controller is configured to perform a statistical analysis of load sensor value received via the output signal from the transducer, the statistical analysis identifying a signal-to-noise ratio in the output signal.

10. The gauge wheel load sensor of claim 9, wherein, if the signal-to-noise ratio is above a preselected value, the down pressure controller is further configured to adjust mapped values to reduce a target setpoint for the gauge wheel, including reducing an orifice diameter of the controllable variable orifice to increase a relief pressure.

11. The gauge wheel load sensor of claim 10, wherein, if the signal-to-noise ratio is below the preselected value, the down pressure controller is further configured to adjust mapped values to increase the target setpoint for the gauge wheel, including increasing the orifice diameter of the controllable variable orifice to decrease the relief pressure.

12. The gauge wheel load sensor of claim 9, wherein, if the signal-to-noise ratio is below the preselected value, the down pressure controller is further configured to adjust mapped values to increase the target setpoint for the gauge wheel, including increasing an orifice diameter of the controllable variable orifice to decrease a relief pressure.

13. A gauge wheel load sensor for an agricultural planter having a row unit that includes a pivotably mounted gauge wheel and a down pressure controller for controlling the down pressure on at least a portion of the row unit, the load sensor comprising:
a mechanical element mounted for movement in response to the down pressure applied on the at least a portion of the row unit;
a fluid-containing device containing a movable element coupled to the mechanical element for changing the fluid pressure in the fluid-containing device in response to the movement of the mechanical element;
a transducer coupled to the fluid-containing device for producing an output signal in response to changes in the fluid pressure, the transducer providing the output signal to the down pressure controller for controlling the down pressure applied on the at least a portion of the row unit; and
an energy storage device coupled to the fluid-containing device for receiving a limited amount of fluid in response to changes in the fluid pressure to damp pressure spikes in the output signal of the transducer.

14. The gauge wheel load sensor of claim 13, wherein the fluid-containing device is a hydraulic cylinder and the movable element is a piston in the hydraulic cylinder.

15. The gauge wheel load sensor of claim 13, wherein the energy storage device is an accumulator receiving pressurized fluid from the fluid-containing device, the accumulator containing another movable element responsive to pressure of fluid received from the fluid-containing device.

16. An agricultural planter row unit comprising:
a pivotably mounted gauge wheel;

a down pressure controller for controlling the elevation of the agricultural planter row unit;

a pair of gauge wheel support arms mounted to the gauge wheel for pivoting movement independently of each other;

a gauge wheel equalizer arm extending transversely across the pair of gauge wheel support arms and mounted for pivoting movement about an axis extending in a direction of travel of the agricultural planter row unit; and a pair of contact rollers mounted on opposite ends of the gauge wheel equalizer arm, each of the pair of contact rollers engaging different ones of the pair of gauge wheel support arms for pivoting the gauge wheel equalizer arm in response to independent vertical movements of the pair of gauge wheel support arms, the pivoting of the gauge wheel equalizer arm being without producing sliding friction between the pair of gauge wheel support arms and the gauge wheel equalizer arm.

17. The agricultural planter row unit of claim 16, further comprising a rocker arm that is coupled to the center of the gauge wheel equalizer arm and is mounted for pivoting movement in response to changes in elevation of the center of the gauge wheel equalizer arm.

* * * * *